US008511860B2

(12) United States Patent
Kotovsky et al.

(10) Patent No.: US 8,511,860 B2
(45) **Date of Patent: *Aug. 20, 2013**

(54) METHOD AND APPARATUS FOR LIGHTING WITH REFLECTION

(76) Inventors: Irwin Kotovsky, Pittsburgh, PA (US); Serge Cornelissen, Roeselare (BE); Robert Cornelissen, Roeselare (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,679

(22) Filed: Jun. 28, 2012

(65) Prior Publication Data

US 2012/0262926 A1 Oct. 18, 2012

Related U.S. Application Data

(62) Division of application No. 13/135,709, filed on Jul. 13, 2011, now Pat. No. 8,210,720, which is a division of application No. 12/657,156, filed on Jan. 14, 2010, now abandoned, which is a division of application No. 11/977,707, filed on Oct. 25, 2007, now abandoned, which is a division of application No. 10/428,795, filed on May 2, 2003, now Pat. No. 7,300,176.

(51) Int. Cl.
*F21V 17/02* (2006.01)
*B60Q 1/14* (2006.01)

(52) U.S. Cl.
USPC ........................ 362/282; 362/284; 362/296.01

(58) Field of Classification Search
USPC ............................. 362/282–285, 296.01, 427
See application file for complete search history.

(56) References Cited

U.S. PATENT DOCUMENTS

| | | | | |
|---|---|---|---|---|
| 5,333,102 | A * | 7/1994 | Oberman et al. | 362/382 |
| 5,479,322 | A * | 12/1995 | Kacheria | 362/581 |
| 5,765,943 | A * | 6/1998 | Verdier | 362/268 |
| 5,951,139 | A * | 9/1999 | Smith et al. | 362/33 |
| 6,036,335 | A * | 3/2000 | Openiano | 362/241 |
| 8,210,720 | B2 * | 7/2012 | Kotovsky et al. | 362/282 |

* cited by examiner

*Primary Examiner* — John A Ward
(74) *Attorney, Agent, or Firm* — Ansel M. Schwartz

(57) ABSTRACT

A mirror module includes a mirror. The module includes a mirror housing. The module includes a mounting box that fits into the housing. The module includes a motorized element disposed in the mounting box. The motorized element having a mirror mounting plate which holds the mirror, and a base plate which is attached to the mounting box through an axis screw at a central axis of the module about which the motorized element rotates.

13 Claims, 30 Drawing Sheets

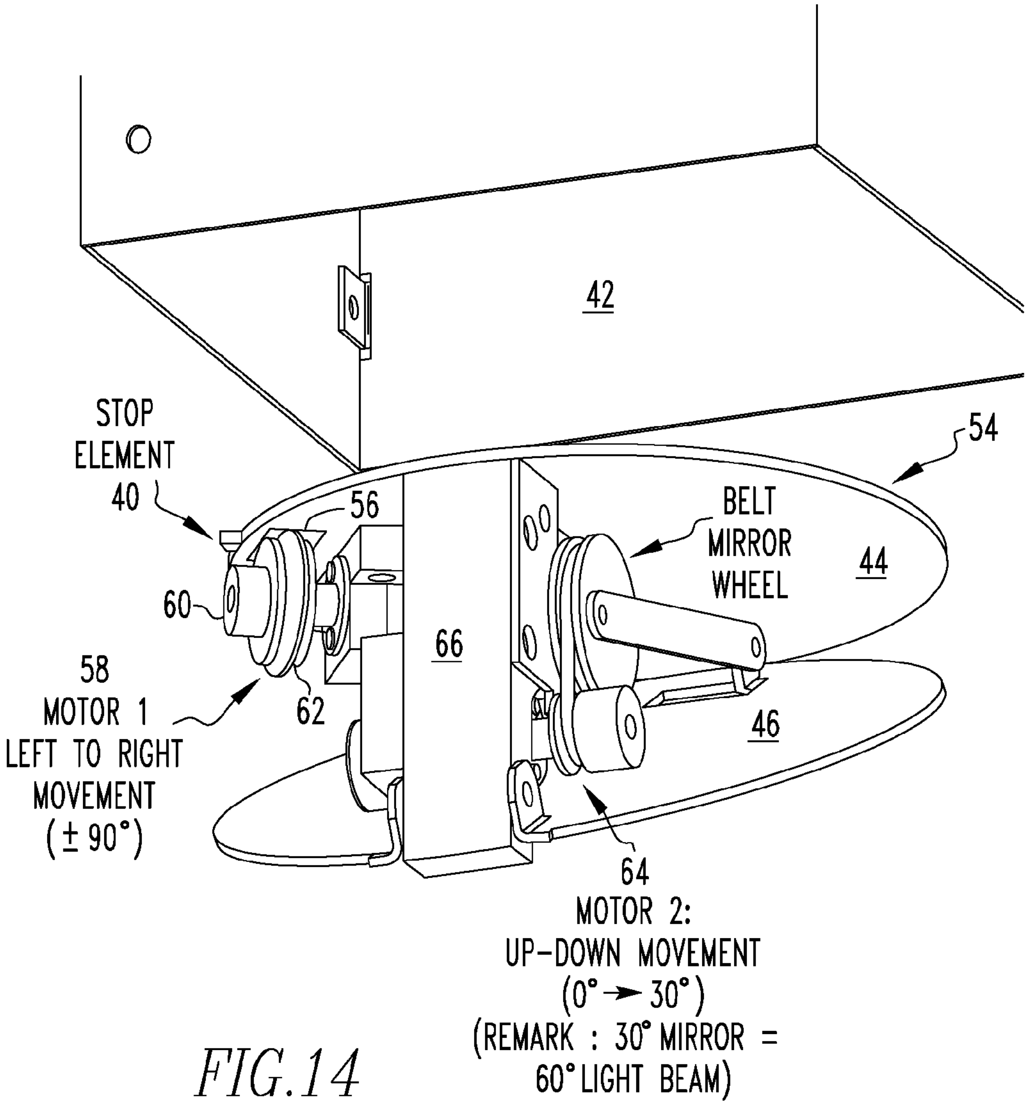
FIG.14
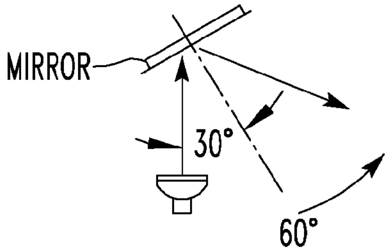

NOTE:
1. AVAILABLE FIXTURE MATERIALS:
   - STAINLESS STEEL
   - ALUMINUM
   - PAINTED STEEL
   - PLASTIC
2. REFLECTOR TO BE:
   - AVAILABLE IN SPECULAR OR DIFFUSED FINISH
   - AVAILABLE IN SQUARE OR ROUND
   - FLAT, ANGULAR, AND PARABOLIC AVAILABLE

NOTE:
1. AVAILABLE FIXTURE MATERIALS:
   -STAINLESS STEEL
   -ALUMINUM
   -PAINTED STEEL
   -PLASTIC
2. REFLECTOR TO BE:
   -AVAILABLE IN SPECULAR OR DIFFUSED FINISH
   -AVAILABLE IN SQUARE OR ROUND
   -FLAT, ANGULAR, AND PARABOLIC AVAILABLE

NOTE:
1. AVAILABLE FIXTURE MATERIALS:
   - STAINLESS STEEL
   - ALUMINUM
   - PAINTED STEEL
   - PLASTIC
2. REFLECTOR TO BE:
   - AVAILABLE IN SPECULAR OR DIFFUSED FINISH
   - AVAILABLE IN SQUARE OR ROUND
   - FLAT, ANGULAR, AND PARABOLIC AVAILABLE

NOTE:
1. AVAILABLE FIXTURE MATERIALS:
   - STAINLESS STEEL
   - ALUMINUM
   - PAINTED STEEL
   - PLASTIC
2. REFLECTOR TO BE:
   - AVAILABLE IN SPECULAR OR DIFFUSED FINISH
   - AVAILABLE IN SQUARE OR ROUND
   - FLAT, ANGULAR, AND PARABOLIC AVAILABLE

NOTE:
1. AVAILABLE FIXTURE MATERIALS:
   - STAINLESS STEEL
   - ALUMINUM
   - PAINTED STEEL
   - PLASTIC
2. REFLECTOR TO BE:
   - AVAILABLE IN SPECULAR OR DIFFUSED FINISH
   - AVAILABLE IN SQUARE OR ROUND
   - FLAT, ANGULAR, AND PARABOLIC AVAILABLE

TOP VIEW

NOTE:
1. AVAILABLE FIXTURE MATERIALS:
   - STAINLESS STEEL
   - ALUMINUM
   - PAINTED STEEL
   - PLASTIC
2. REFLECTOR TO BE:
   - AVAILABLE IN SPECULAR OR DIFFUSED FINISH
   - AVAILABLE IN SQUARE OR ROUND
   - FLAT, ANGULAR, AND PARABOLIC AVAILABLE

-AVAILABLE IN SPECULAR OR DIFFUSED FINISHED
-AVAILABLE IN SQUARE OR ROUND
-FLAT, ANGULAR, AND PARABOLIC AVAILABLE

METHOD AND APPARATUS FOR LIGHTING WITH REFLECTION

CROSS-REFERENCE TO RELATED APPLICATIONS

This application is a divisional of U.S. patent application Ser. No. 13/135,709 filed Jul. 13, 2011 now U.S. Pat. No. 8,210,720, which is a divisional of U.S. patent application Ser. No. 12/657,156 filed Jan. 14, 2010 now abandoned, which is a divisional of U.S. patent application Ser. No. 11/977,707 filed Oct. 25, 2007 now abandoned, which is a divisional of U.S. patent application Ser. No. 10/428,795 filed May 2, 2003, now U.S. Pat. No. 7,300,176 issued Nov. 27, 2007, all of which are incorporated by reference herein.

FIELD OF THE INVENTION

The present invention is related to lighting with reflectors. More specifically, the present invention is related to lighting with reflectors that are connected to housings having light sources that are in spaced relation with the reflectors.

BACKGROUND OF THE INVENTION

Lighting is second nature in this day and age. It can serve both the function of illuminating locations as well as making artistic statements. Furthermore, the generally recognized form of lighting that is the most pleasing to the eye is indirect lighting, such as that obtained through reflection. The present invention is just such a type of lighting; it can make an artistic statement, and provide indirect lighting.

SUMMARY OF THE INVENTION

The present invention pertains to an apparatus for lighting. The apparatus comprises a first light source. The apparatus comprises a first housing in which the first light source is disposed. The apparatus comprises a support structure to which the first housing is attached. The apparatus comprises a reflection portion having a least two reflectors. The reflection portion attached to the support structure and in spaced relationship with the first housing such that light from the first light source is directed to desired locations.

The present invention pertains to an apparatus for lighting. The apparatus comprises a first light source. The apparatus comprises a first housing in which the first light source is disposed. The apparatus comprises a support structure to which the first light source is attached. The apparatus comprises a second light source. The apparatus comprises a second housing in which the second light source is disposed. The second housing attached to the support structure and in spaced relationship with the first housing. The apparatus comprises a first reflector disposed with the second housing and opposing the first light source so light emitted by the first light source is reflected by the first reflector.

The present invention pertains to a mirror module. The module comprises a mirror. The module comprises a mirror housing. The module comprises a mounting box that fits into the housing. The module comprises a motorized element disposed in the mounting box. The motorized element having a mirror mounting plate which holds the mirror, and a base plate which is attached to the mounting box through an axis screw at a central axis of the module about which the motorized element rotates.

BRIEF DESCRIPTION OF THE DRAWINGS

In the accompanying drawings, the preferred embodiment of the invention and preferred methods of practicing the invention are illustrated in which:

FIG. 14 is a schematic representation of an exploded view of the motorized mirror element and the mounting box.

DETAILED DESCRIPTION

Figure 1:
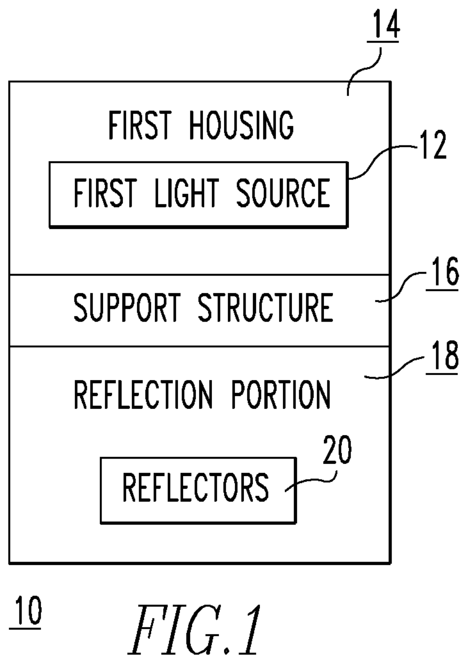
FIG. 1 is a block diagram of a lighting apparatus of the present invention.
Figure 16:
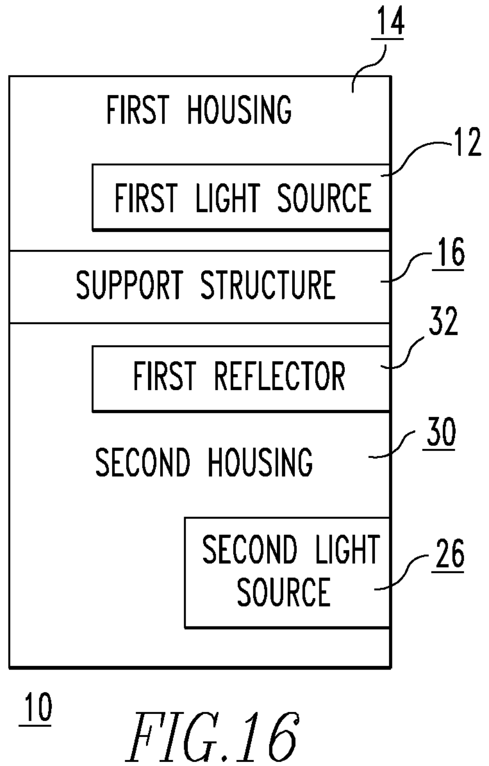
FIG. 16 is a block diagram of an alternative embodiment of a lighting apparatus of the present invention.

Referring now to the drawings wherein like reference numerals refer to similar or identical parts throughout the several views, and more specifically to FIG. 1 thereof, there is shown an apparatus 10 for lighting. The apparatus 10 comprises a first light source 12. The apparatus 10 comprises a first housing 14 in which the first light source 12 is disposed. The apparatus 10 comprises a support structure 16 to which the first housing 14 is attached. The apparatus 10 comprises a reflection portion 18 having a least two reflectors 20. The reflection portion 18 attached to the support structure 16 and in spaced relationship with the first housing 14 such that light from the first light source 12 is directed to desired locations.

Preferably, the reflectors 20 in the reflection portion 18 are movable in the reflection portion 18 so the reflectors 20 can be moved so light is reflected by the reflectors 20 to desired locations. The first housing 14 preferably has a curved or rhombohedron cross-section. Preferably, the first housing 14 includes a housing reflector 22 which reflects light reflected from the reflection portion 18. The apparatus 10 preferably has a secondary reflector 24 attached to the support structure 16 and reflecting light from the light source and the housing reflector 22. The reflection portion 18 disposed between the secondary reflector 24 and the first light source 12.

Preferably, the support structure 16 includes a second light source 26 disposed in the first housing 14 emitting light in a direction opposite the direction the first light source 12 emits light, and a bottom reflector 28 disposed adjacent to the housing and positioned to reflect light from the second light source 26. The reflectors 20 in the reflection portion 18 preferably are motorized.

The present invention pertains to an apparatus 10 for lighting. The apparatus 10 comprises a first light source 12. The apparatus 10 comprises a first housing 14 in which the first light source 12 is disposed. The apparatus 10 comprises a support structure 16 to which the first light source 12 is attached. The apparatus 10 comprises a second light source 26. The apparatus 10 comprises a second housing 30 in which the second light source 26 is disposed. The second housing 30 attached to the support structure 16 and in spaced relationship with the first housing 14. The apparatus 10 comprises a first reflector 32 disposed with the second housing 30 and opposing the first light source 12 so light emitted by the first light source 12 is reflected by the first reflector 32.

Preferably, the first reflector 32 is movable. The apparatus 10 preferably has at least a second reflector 34 disposed with the second housing 30 and opposing the first light source 12 so light emitted by the first light source 12 is reflected by the second reflector 34. Preferably, the apparatus 10 includes a third housing attached to the support structure 16 adjacent the second housing 30 and in spaced relationship with the first housing 14. There is a third light source disposed in the third housing and a second reflector 34 disposed with the third housing opposing the first light source 12 so light emitted by the first light source 12 is reflected by the second reflector 34.

The apparatus 10 preferably has a third reflector 36 attached to the support structure 16, in spaced relationship with the second light source 26 and positioned to reflect light emitted by the second light source 26. Preferably, the apparatus 10 includes a fourth reflector 38 attached to the support structure 16, in spaced relationship with the third reflector 36, and positioned to reflect light emitted by the second light source 26, with the third reflector 36 between the second light source 26 and the fourth reflector 38. The first reflector 32 preferably is motorized. Preferably, the second and third reflectors 34, 36 are motorized.

In the operation of the invention, in a first embodiment, a lighting apparatus 10 is formed of a combination of mirror modules 68 and light modules 68 that are attached to a support structure 16. Each light module 68 comprises a housing with a lamp disposed in the housing and an opening at the top of the housing through which light from the lamp can be emitted from the housing. A light module 68 can also have a mirror disposed in the housing at its bottom. The mirror module 68 comprises a housing with a mirror disposed in its. Electrical wiring 48 can be run to the lamps in each housing module 68 through the support structure 16 so it is not visible.

Figure 2:
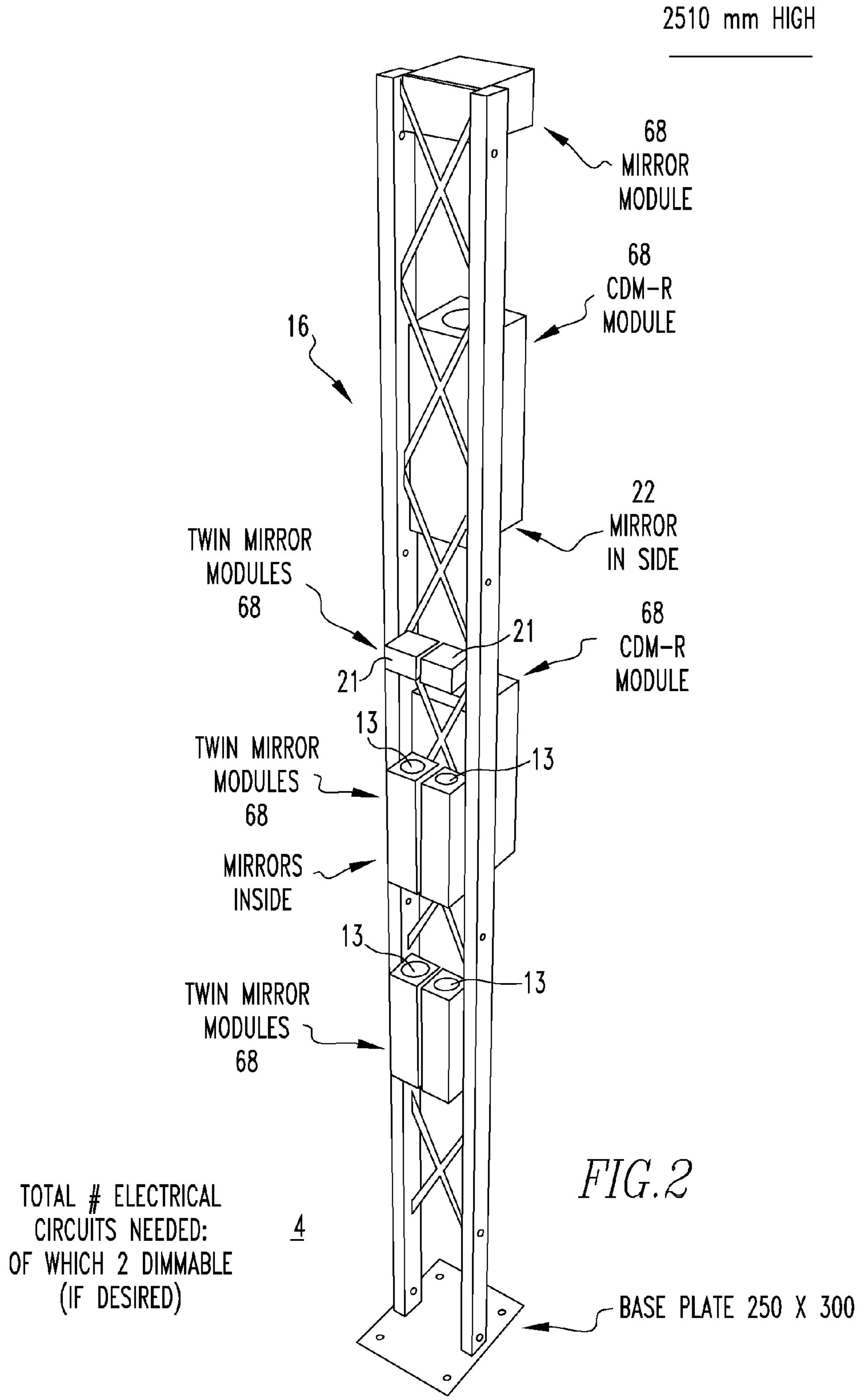
FIG. 2 is a schematic representation of a first embodiment of modules attached to a support structure.
Figure 3:
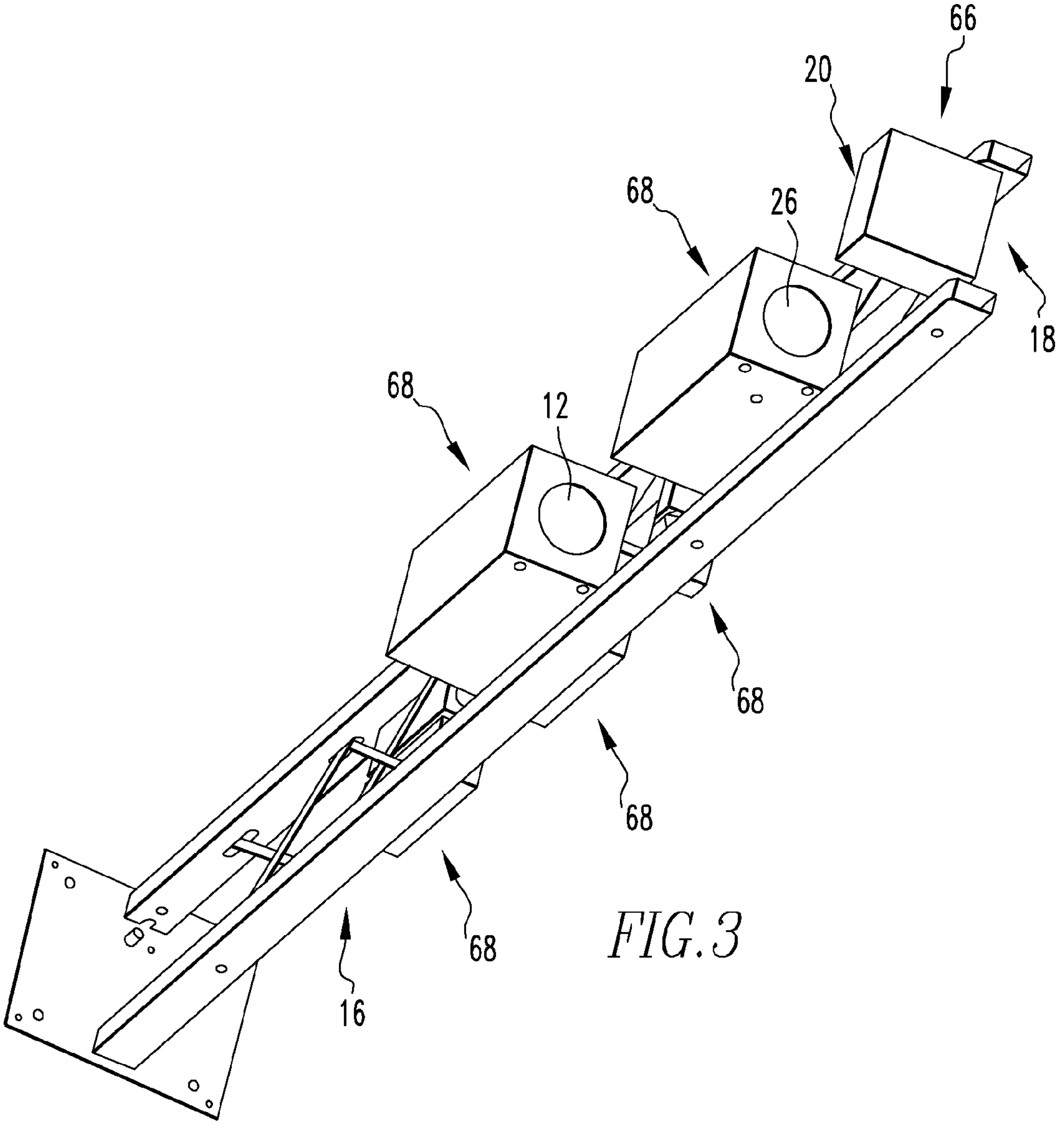
FIG. 3 is a schematic representation of another view of the first embodiment.

The light modules 68 and mirror modules 68 can be positioned in any arrangement desired. For example, as shown in FIGS. 2 and 3, there is a first set of light modules 68 that are comprised of two adjacent light modules 68 attached to the support structure 16 alongside each other and adjacent the base of the support structure 16. There is also a second set of light modules 68 comprised of two light modules 68 attached to the support structure 16 alongside each other and above the first set of light modules 68. The second set of light modules 68 disposed above the first set of light modules 68 have mirrors in them which reflect the light emitted from the first set of light modules 68. Attached to the support structure 16 alongside each other above the second set of light modules 68 are two mirror modules 68. The mirrors of the mirror modules 68 reflect the light emitted from the second set of light modules 68.

On the other side of the support structure 16 are two larger light modules 68 than those light modules 68 described above, with one light module 68 positioned on the support structure 16 above the other light module 68, and having a mirror at its bottom to reflect light emitted by the lower light module 68 attached to the support structure 16. Attached to the support structure 16 above the higher light module 68 of the two light modules 68 on the other side of the support structure 16 is a mirror module 68 which reflects light emitted from the higher light module 68. Each of the light modules 68 and the mirror module 68 is in spaced relation from each other, as are the twin minor modules 68 and the first and second sets of light modules 68 attached to the support structure 16.

Figure 4:
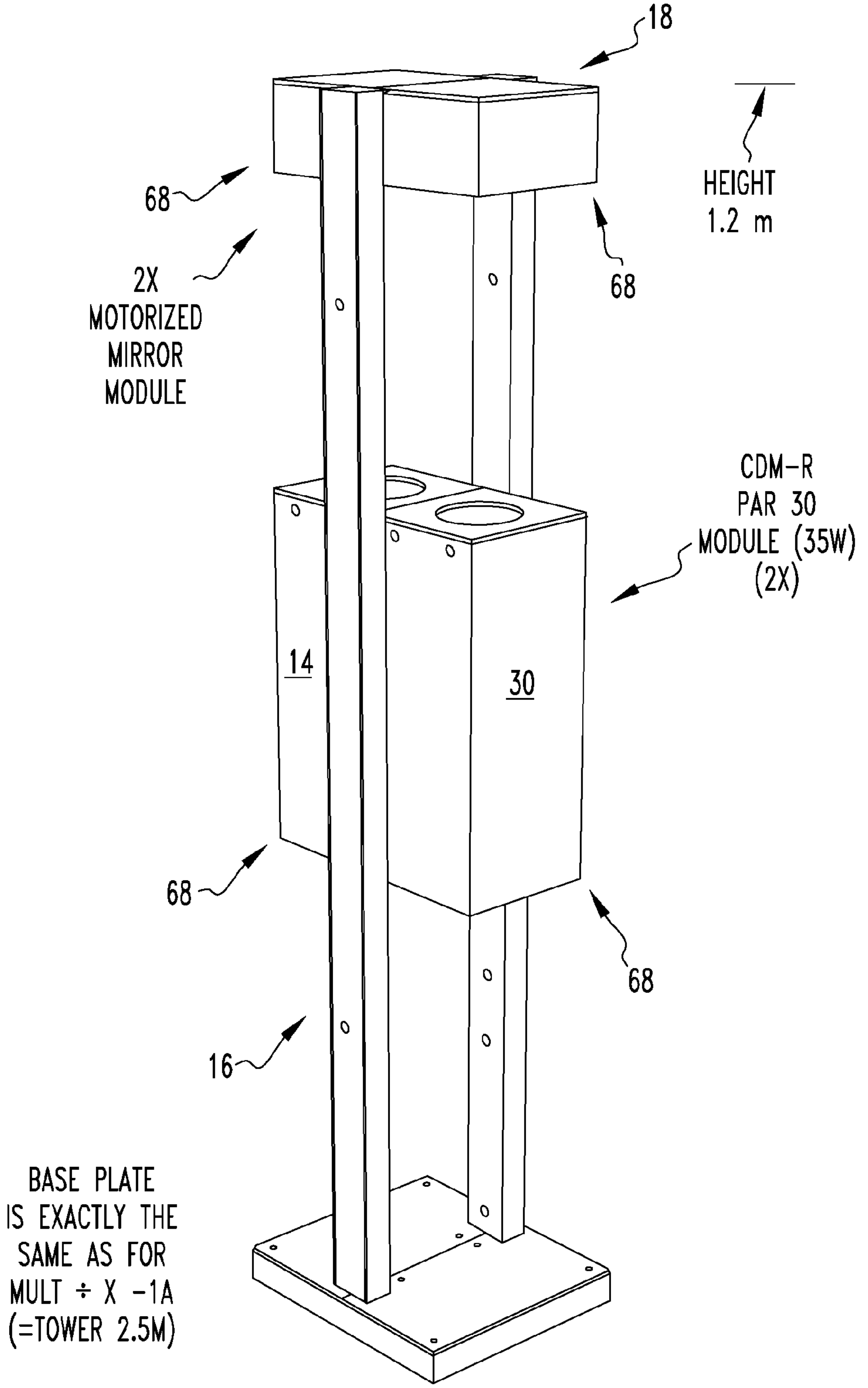
FIG. 4 is a schematic representation of a second embodiment of modules attached to a support structure.
Figure 5:
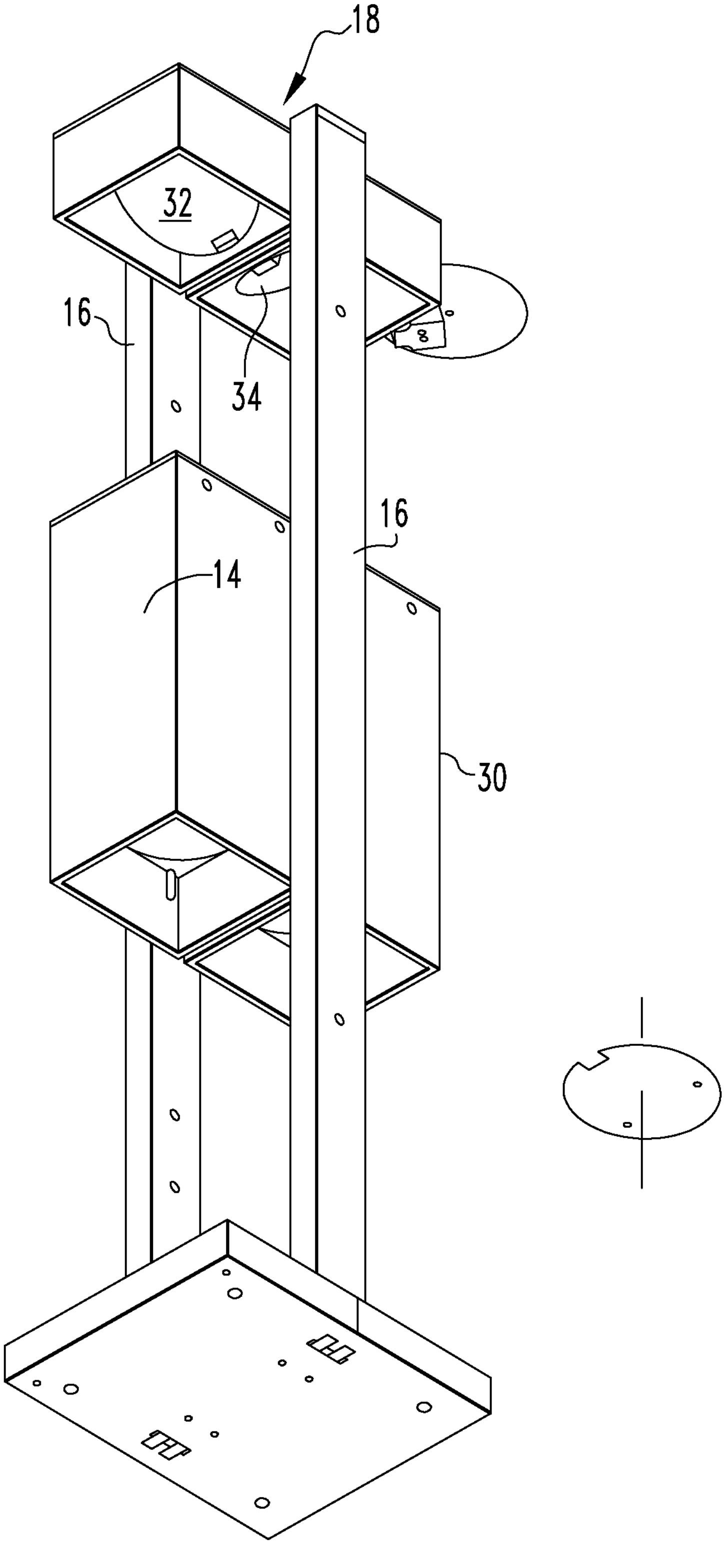
FIG. 5 is a schematic representation of another view of the second embodiment.

FIGS. 4 and 5 show another example of light modules 68 and mirror modules 68 attached to a support structure 16. FIGS. 4 and 5 show two light modules 68 attached to the support structure 16 alongside each other, but on opposite sides of the support structure 16. Attached in a similar fashion above the two light modules 68 are two motorized mirror modules 68 which reflect light emitted by the two light modules 68. The mirror modules 68 are in spaced relation with the light modules 68. The mirror modules 68 are operated by remote control so that each mirror module 68 can independently be positioned to reflect light at a desired angle emitted by the two light modules 68.

Another example is based upon a modular system with 3 types of elements: 1. a support structure 16, 2. one or more light-generating elements, and 3. one or more mirror-elements.

To illustrate the example, four different fixtures with the same height (approx. 2 m) are shown.

Figure 6C:
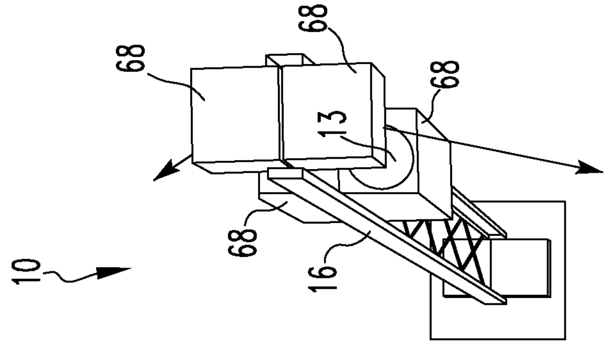
FIG. 6 is a schematic representation of an overhead prospective view of several embodiments of modules attached to support structures in a row.
Figure 6B:
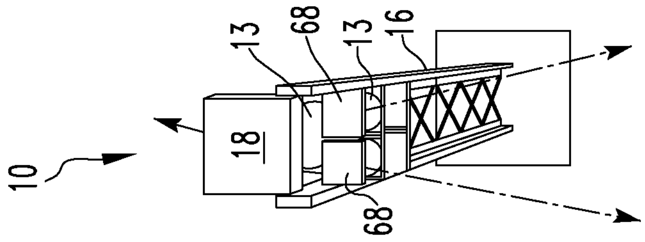
Figure 6A:
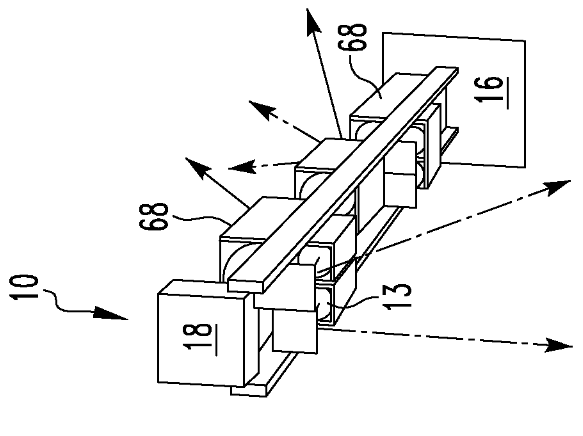

The basic idea is to make a free-standing structure that can be fixed on the floor or onto walls. This structure also contains the wiring 48 that goes to the light modules 68. The structure consists of two T-shaped hollow elements (extrusions) (see FIG. 6), that can be connected to one another if this is necessary for the strength or for aesthetic reasons. This connecting element is X-shaped, but, in fact, it can have any shape.

On this structure is fixed the lighting elements that each contain one or more lamps with the necessary gears. It is also possible to add a movable mirror at the bottom of the module 68. In this case, it is possible to "stack" two or more lighting elements on top of each other, so that the top module 68 reflects the light of the module 68 beneath.

The mirror-elements are visually collinear with the matching lighting modules 68. They contain a movable mirror in order to control the direction of the reflected light. Possibly the big mirror elements could contain four independently movable small mirrors instead of one big mirror. Or possible, the mirror-elements cold even contain a V-shaped or convex reflector that is not movable. But no matter what mirror element is used, the fixture always looks the same way because the reflectors 20 are hidden in a small volume.

The illustrations show combinations of CDM-PAR30 modules 68 (profile size 120×120) and MR16 modules 68 (60×60). From a functional point of view, it could be interesting to use the discharge sources to light a large area, and to use narrow-beam MR16 bulbs to put accents. Of course, also other sources could be used, for instance, compact fluorescent lamps in a wide rectangular volume.

The distance between the two T-shaped structure elements is defined by the largest lighting module 68. So in case of fluorescent sources, the fixtures will be wide; but when only small bulbs (e.g. MR16) are used, it is possible to make small fixtures that can be used in private gardens.

To resume the main characteristics: the apparatus 10 is flexible, technical and modular concept, designed to customize the product to the needs of a client.

Another example approaches the "multiple source/multiple reflector" idea from a completely different angle. In this example, the sources are always on top of the fixture, and their light is reflected by multiple reflectors 20 that are at the same level. The idea is to divide the light coming from the source(s) into two parts: a small "nucleus" or hotspot, and the surrounding rest of the beam, the fall-off.

Figure 7:
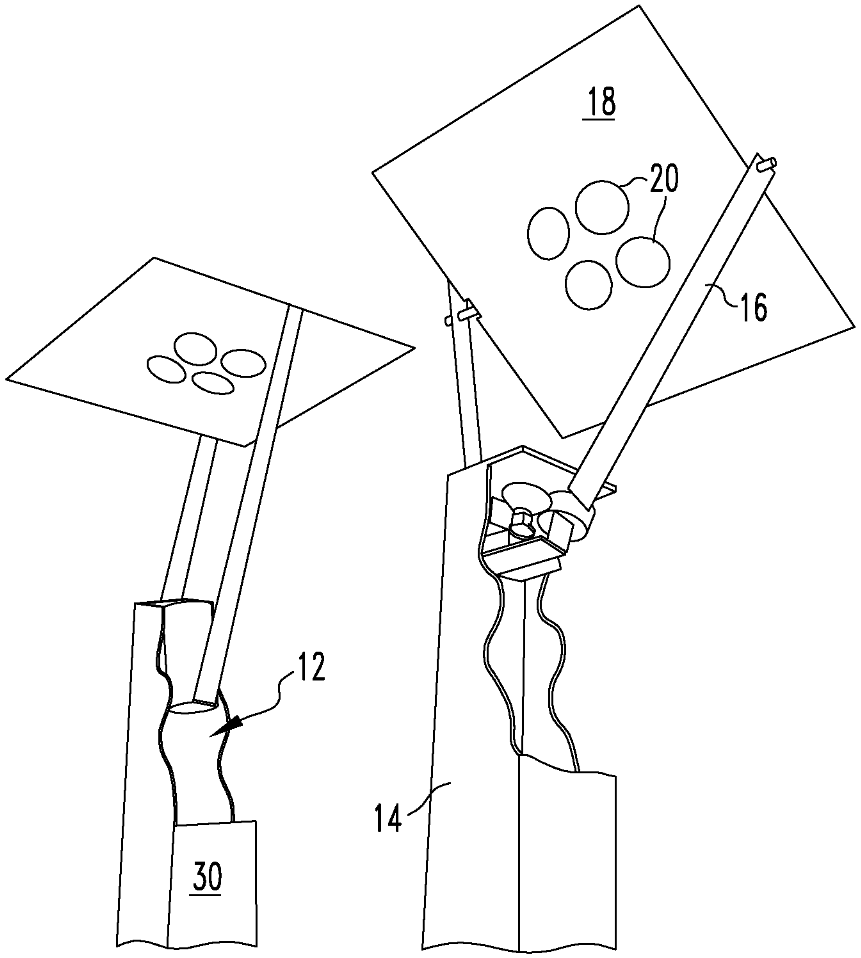
FIG. 7 is a schematic representation of yet another embodiment of the present invention.
Figure 8:
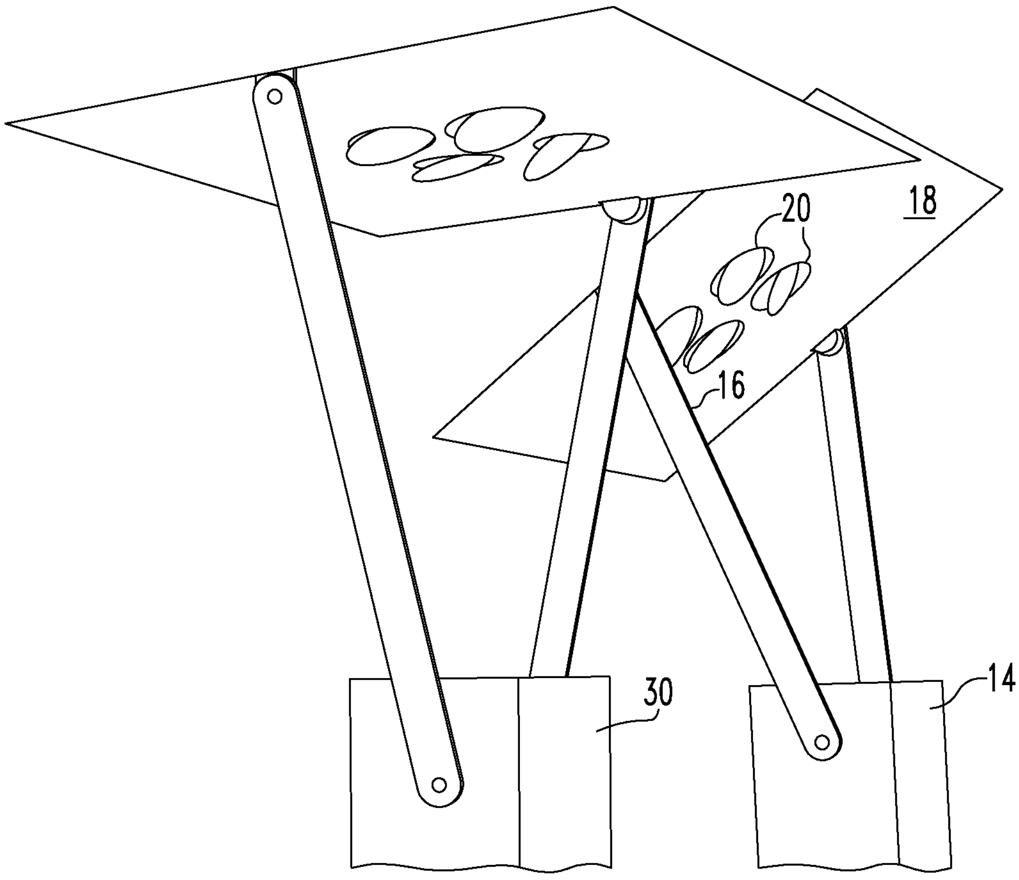
FIG. 8 is a schematic representation of another view of the embodiment shown in FIG. 7.

To illustrate this, one single design was made and given two different sources (again CDM-PAR30, or 4x MR16). In the cut-away FIG. 7 and FIG. 8, it is shown where these sources are located in the fixture.

Both apparatuses have a large screen made of non-brilliant material that captures all the light coming from the source(s) and that provides a soft general lighting to the environment. This screen can be tilted back and forth to direct this light; to increase the directing angle, the whole of screen plus source (s) can also be tilted over an angle of approx. 15 to 30°, depending on the source. The support structure extending from the screen to the light source can be linked so the screen and light source move in tandem and their relationship stays fixed. The cut-away view shows that the MR16 version is tilted in this manner, while the PAR30 has a horizontal screen to provide the same amount of general lighting in all directions. Within the large screen, there can be one or more small mirrors made of highly brilliant reflector material (e.g. aluminum or dichroic glass) that can be directed independently. Each small reflector has its own small directing mechanism, placed into a hole in the large screen. The function of the small mirrors is to capture only the nucleus of the light beam (s), and to put accents to certain details in the environment.

In case of four MR16s, each small mirror reflects the light of one particular bulb. (The bulbs are mounted on a slightly convex socket-holder, so their beams diverge to match the centers of the small mirrors in the screen.) In case of CDM-PAR30, the beam nucleus is divided into four parts, each captured by one mirror. Of course, in both cases, it would have been possible to have only one mirror (with an increased diameter) in the center of the screen, instead of four.

Figure 9:
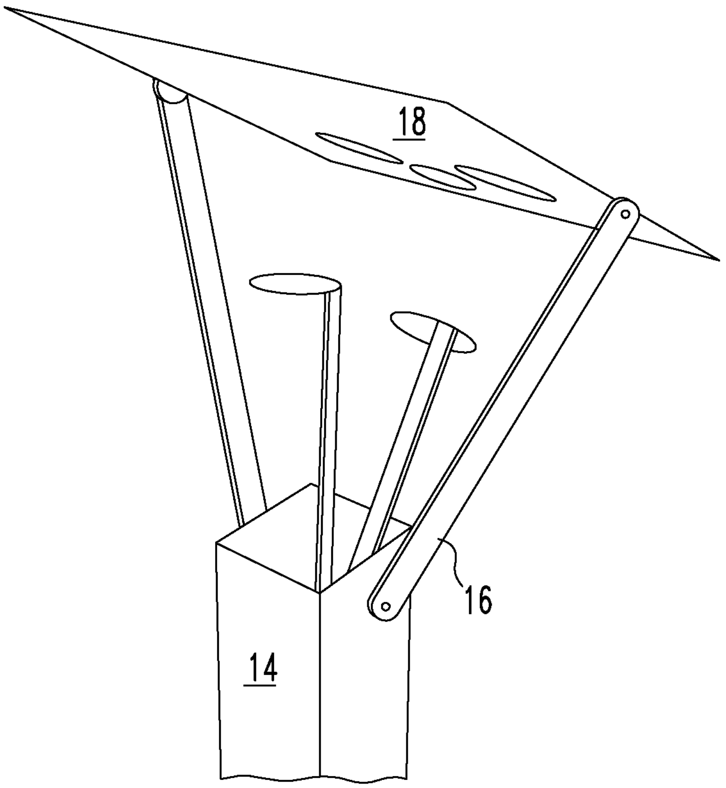
FIG. 9 is a schematic representation of another embodiment of the present invention.

Resuming the main characteristics, the apparatus 10 is amore architecturally designed range of fixtures that always provide two types of light (even with one type of source, and even with one single bulb): both general and accent lighting. The example only shows free-standing pole-shaped fixtures, but it is also possible to apply the embodiment to relatively compact wall fixtures. A variation on the theme could be made by fixing the small mirrors to the individual sources by means of a thin canopy, as shown in FIG. 9.

Figure 10:
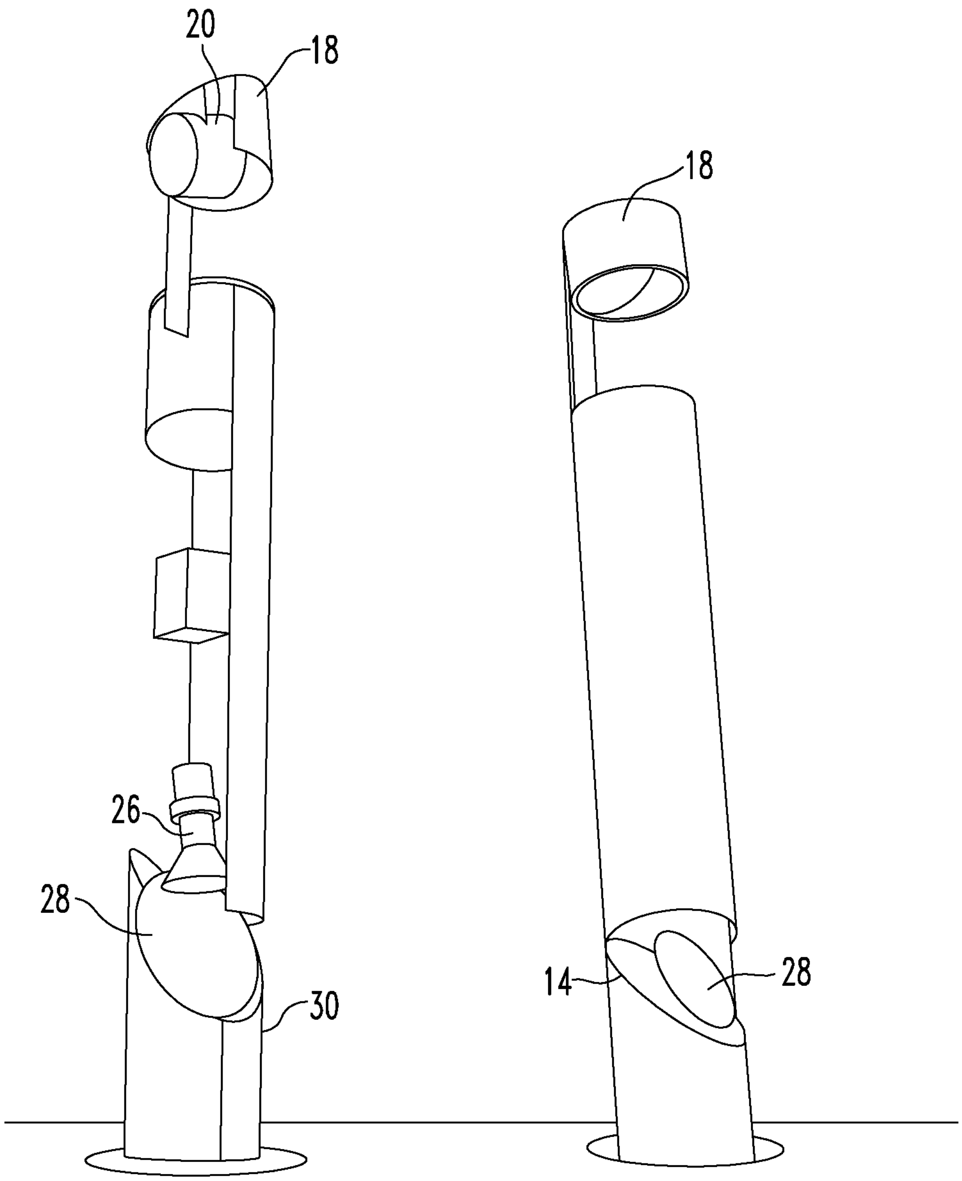
FIG. 10 is a schematic representation of two circular housings having reflector portions.
Figure 11:
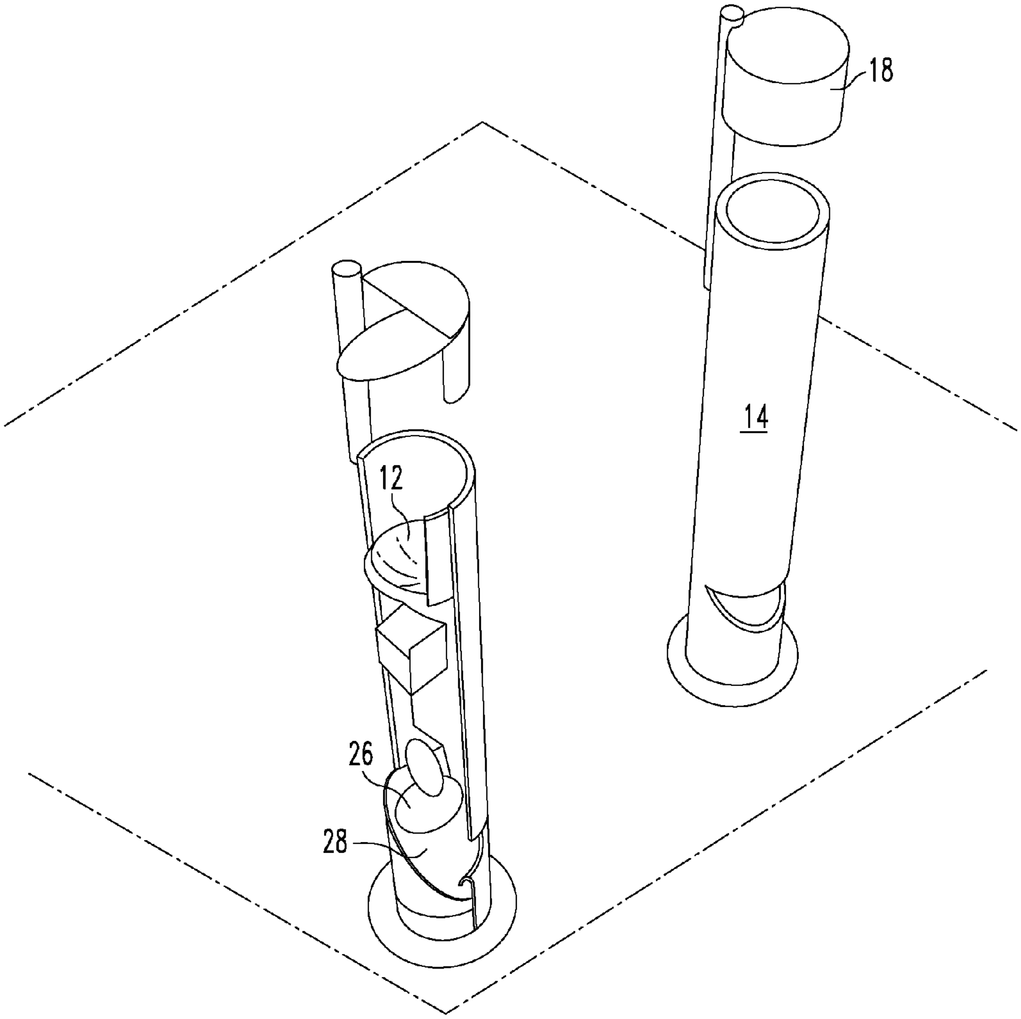
FIG. 11 is a schematic representation of an overhead prospective view of the circular housings having reflector portions shown in FIG. 10.

In another example, as shown in FIGS. 10 and 11, the lighting apparatus 10 has two different light sources, providing two completely different kinds of lighting. On top, there is a powerful AR111 that provides a lighted accent (with a highly brilliant mirror) or a large softly lighted area (with a matte reflector 20). The top reflector 21 can be turned around, so the light beam can be pointed into any direction. This can be done without changing the look of the fixture at the outside; the reflector 20 is put into a cylindric housing for this reason. The AR111 is located deep into its housing, which is painted black at the inside; this is to prevent dazzling.

At the bottom of the lighting apparatus 10, there is a second light source 26 (for instance, PAR20); the light coming from this source is reflected by a mirror that is located at the very bottom of the tube, so that the light will skim the ground surface and, for instance, accentuate its beautiful texture. Or also, indicate a walking area. To protect the reflector 20 from dirt, it is covered by a cylindric glass tube.

An interesting point in this design is that reflectors 20 can also be used to allow the light to reach places that would otherwise be hard to reach. If one would try to skim the surface directly with the lamp instead of by a reflecting mirror, there would be 1. a need for a larger pole diameter, 2. problems ensuring a good visual comfort, and 3. problems connecting the lamp in a safe and waterproof way.

Figure 12:
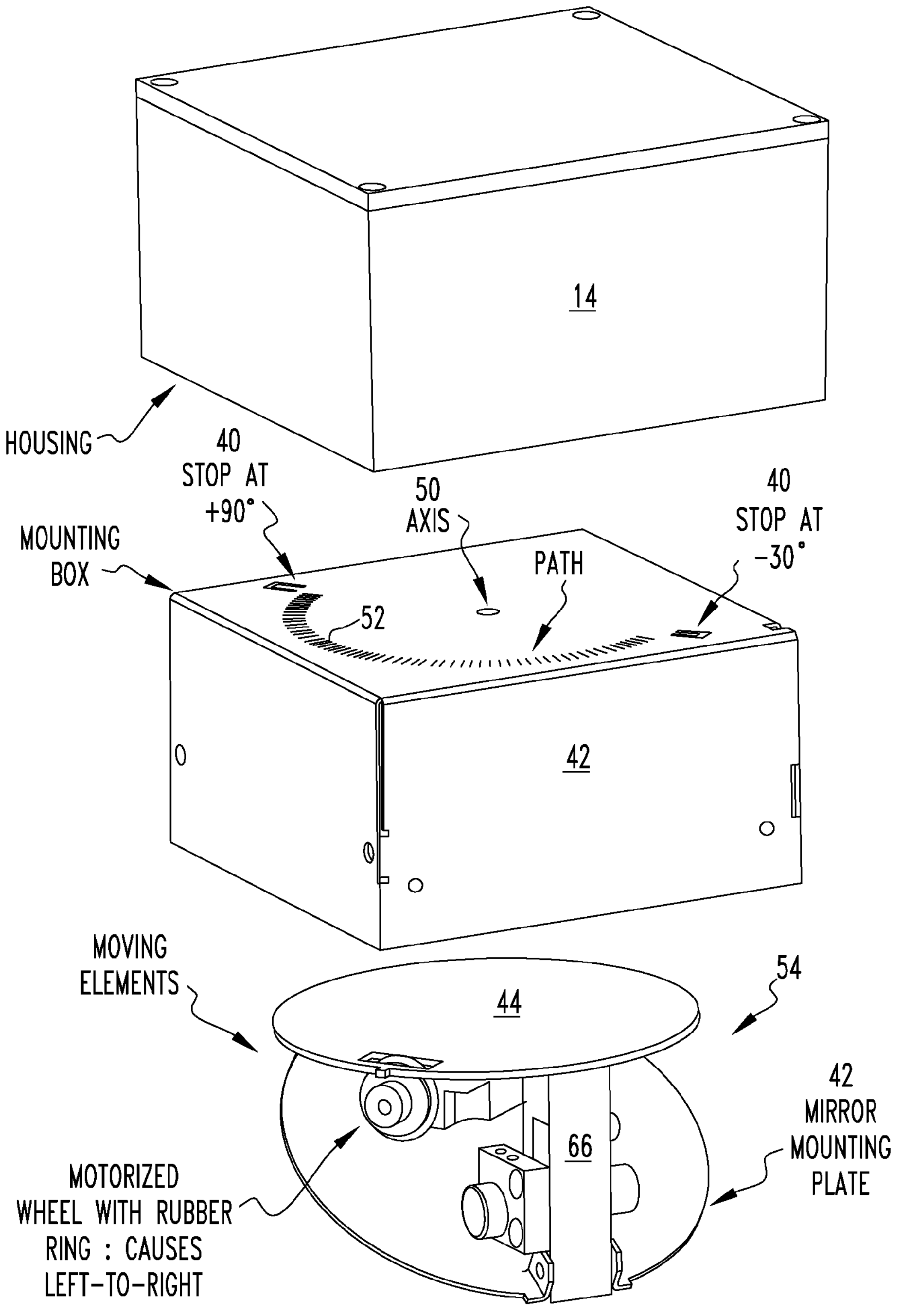
FIG. 12 is an exploded view of a motorized reflector module.

FIG. 12 shows a motorized mirror module 68 that is comprised of a mirror housing, a mounting box 42 that fits in the mirror housing and a motorized element 54 that is disposed in the mounting box 42. The mirror housing mounts, for example, to the support structure 16. The mounting box 42 is fixed to the housing through pins or screws. The motorized element 54 is fixed to the mounting box 42 through its base plate 44 that is connected to the mounting box 42 through an axis 50 screw at the central axis 50 of the mirror module 68 about which the motorized element 54 rotates. The motorized element 54 has a motorized wheel 62 mounted to the base plate 44 and extending through a slot 56 in the base plate 44. The motorized wheel 62 moves along a pre-defined path 52 on the mounting box 42 with a stop 40 present at +90 degrees and a stop 40 present at −90 degrees to define a range of motion of the motorized wheel 62 and thus the motorized element 54 in a rotational direction around the axis 50.

Figure 13:
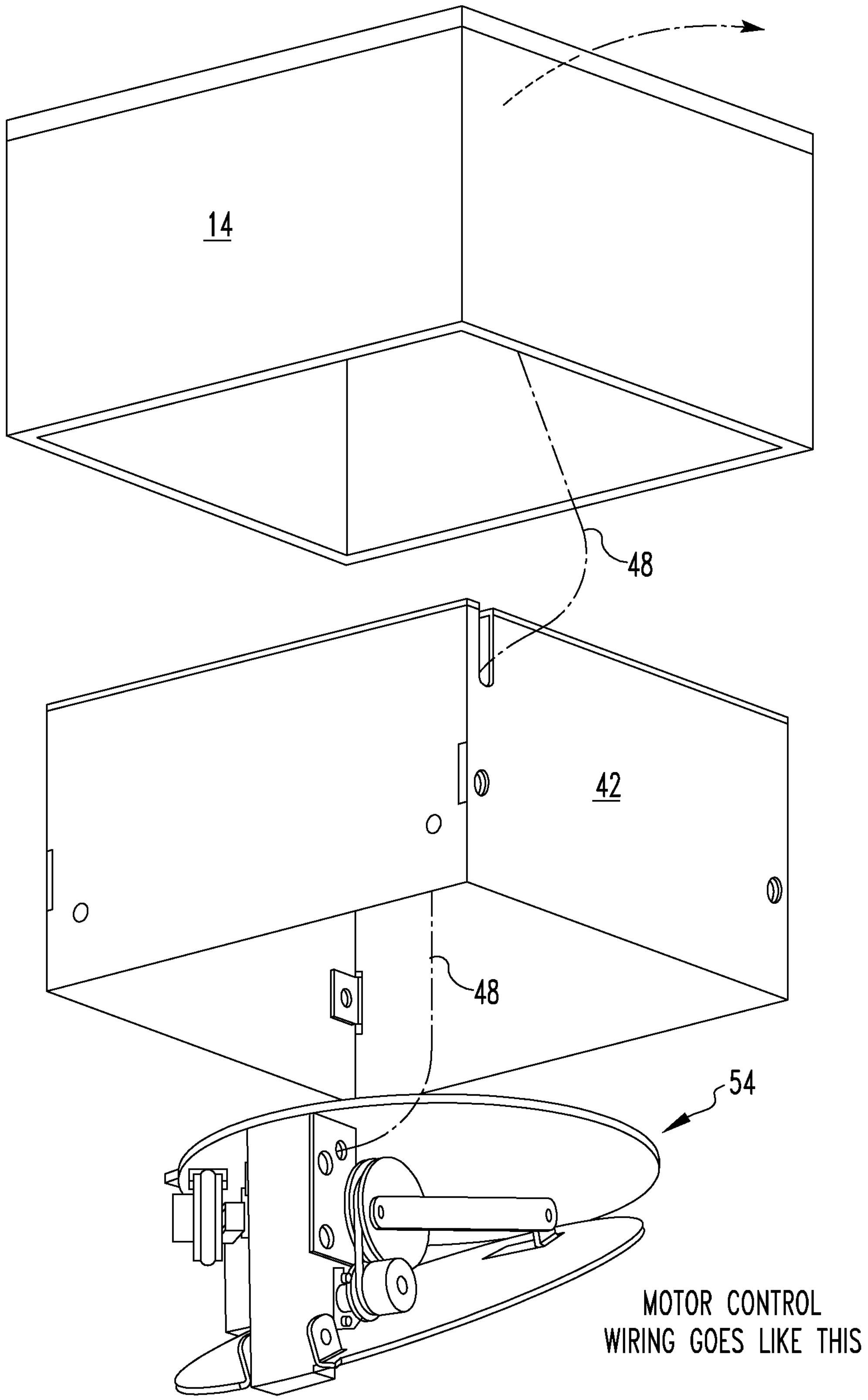
FIG. 13 is an exploded view of a motorized reflector module and its wiring.

FIG. 13 shows how the motorized element 54 receives its control and power wiring 48. Wiring 48 from the first motor 58 and the second motor 64 of the mirror element extends up through the mounting block through the housing and then to the support structure 16.

Figure 15:
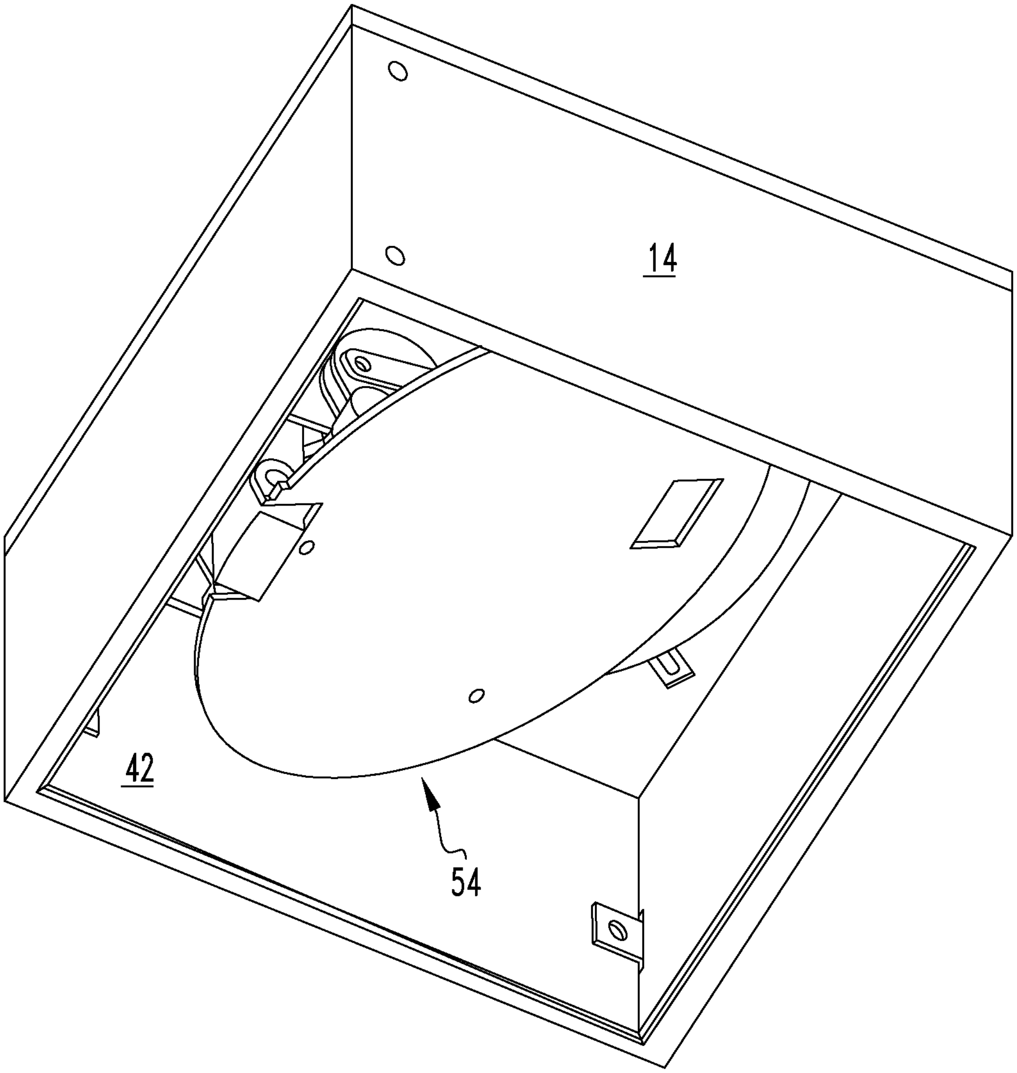
FIG. 15 is a schematic representation of the motorized mirror module assembled.

FIG. 14 shows the mirror element in more detail. There is a first motor 58 mounted to the base plate 44 that has a cylinder 60 on which the motorized wheel 62 is attached, as explained above, which extends to a slot 56 in the base plate 44. The first motor 58 provides rotational or left-to-right movement between a +90 degrees and a −90 degrees. There is a second motor 64 mounted to the base plate 44 that provides a belt driven wheel 62 up-to-down movement of 0 degrees to 33 degrees. There is a mirror mounting plate 46 attached to a stem 66 which extends from the base plate 44, on which the reflector 20 is fixed. The first and second motors 58, 64 themselves are well known in the art. What is unique is how the first and second motors 58, 64 are used in regard to a reflector 20 element. For example, a mirror set at 30 degrees, causes light reflected from the mirror fixed to the mirror mounting plate 46 to be at 60 degrees. FIG. 15 shows the assembled motorized mirror module 68 from below.

Figure 17A:
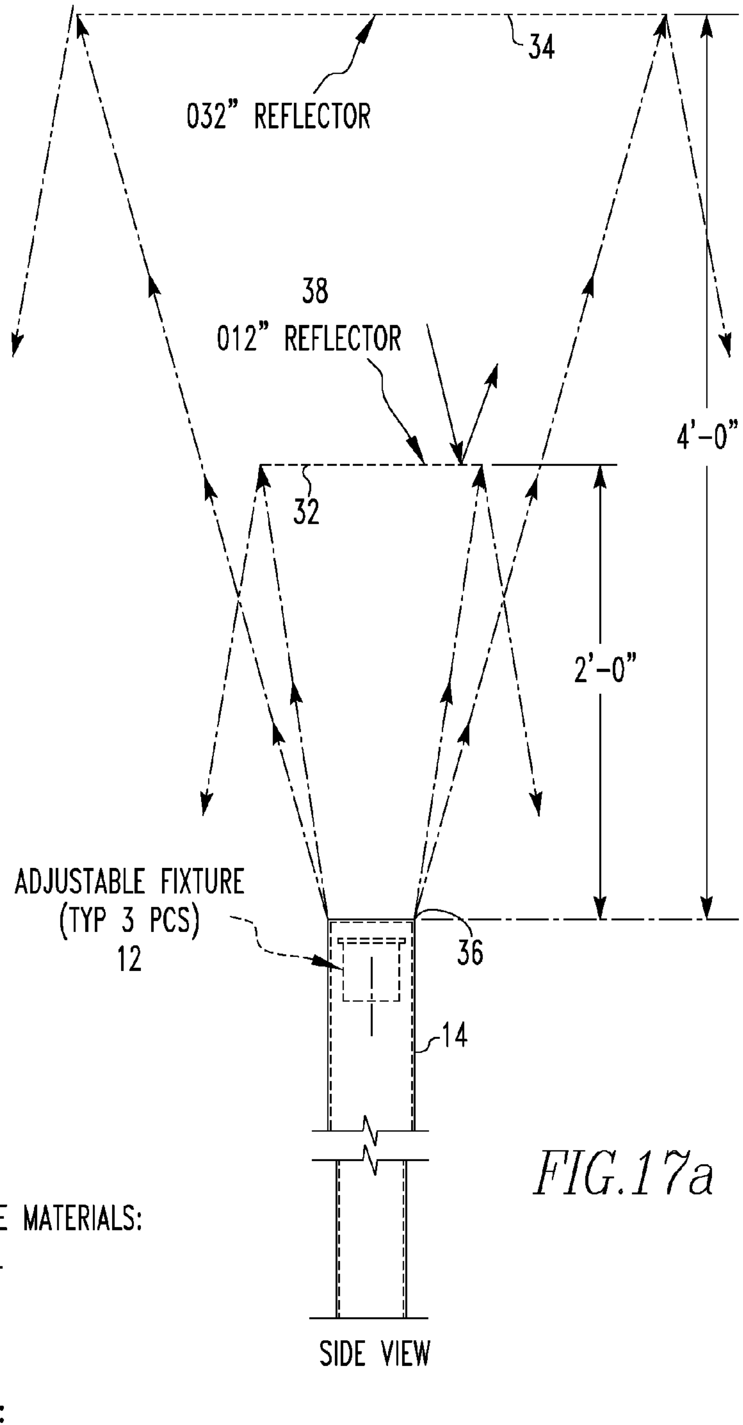
FIGS. 17*a*, 17*b* and 17*c* are schematic representations of a housing with a light source and a plurality of reflectors.
Figure 17B:
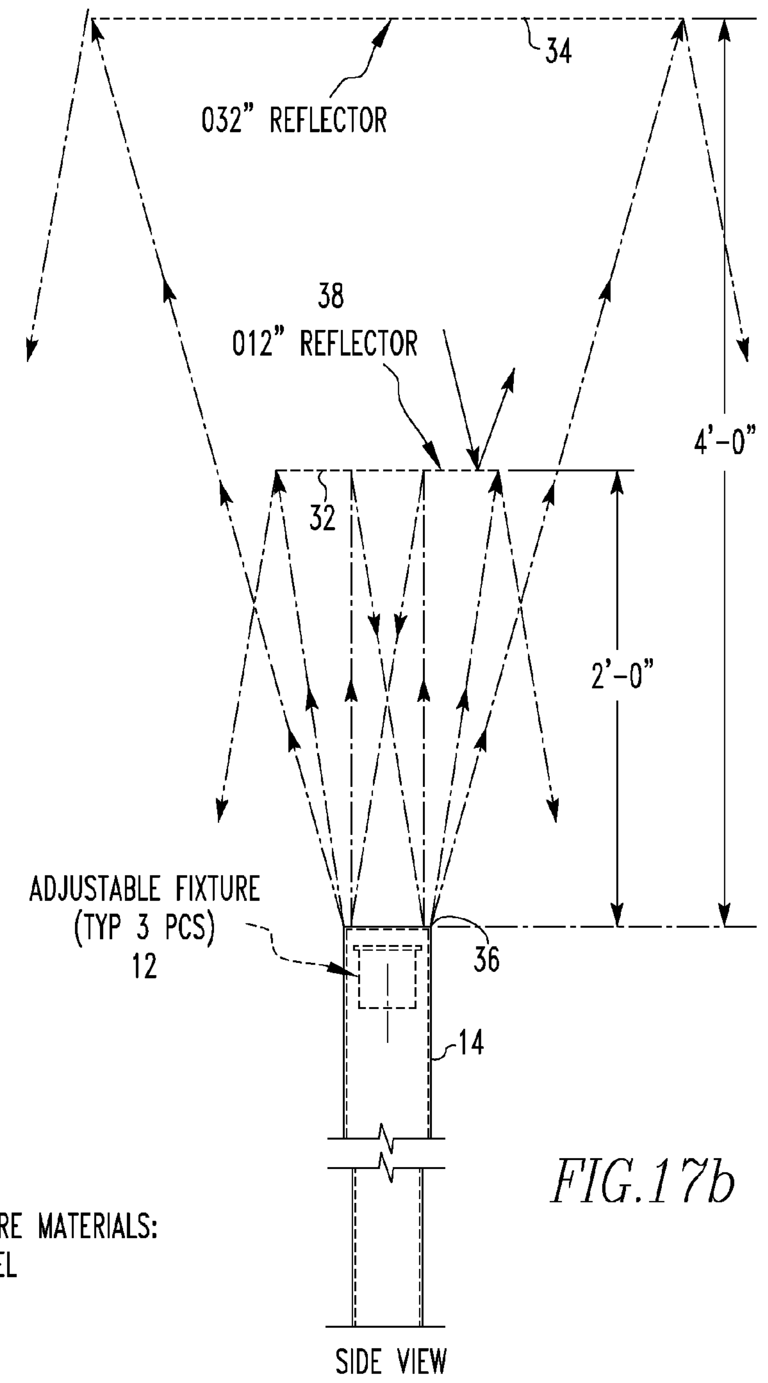
Figure 17C:
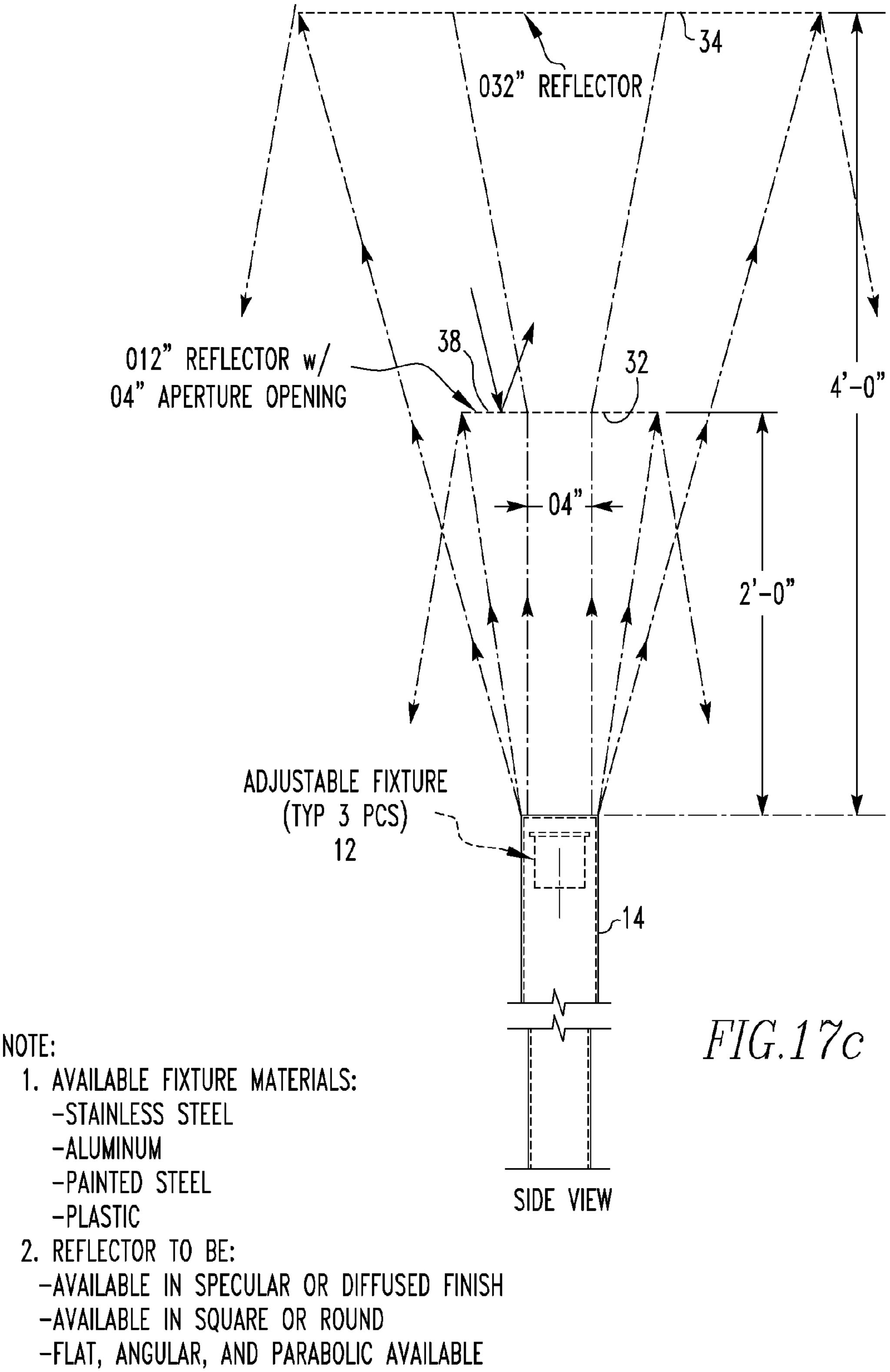
Figures 18, 19, 20, 21, 22, 23, 24, 25, 26, 27, 28, 29:
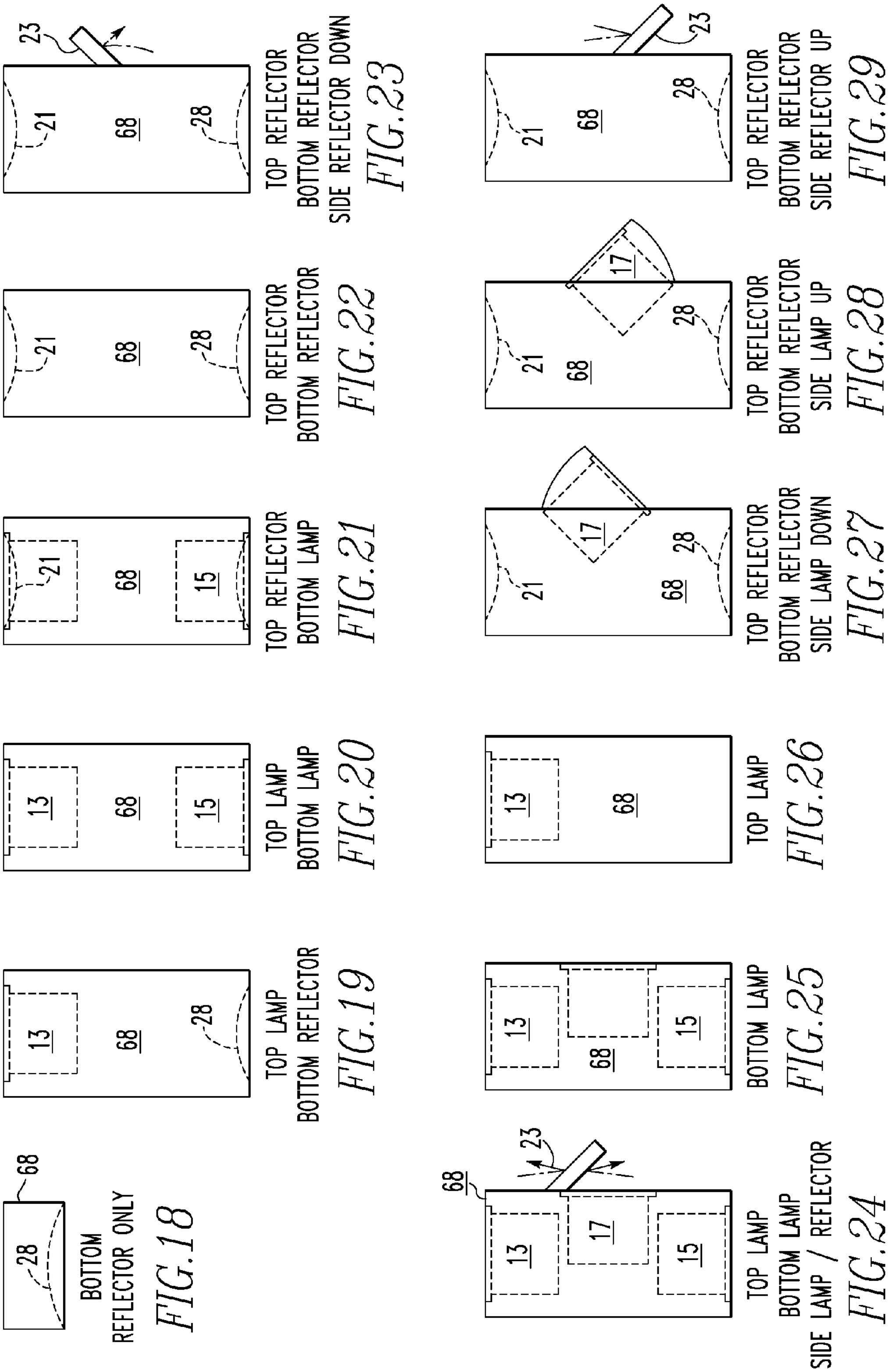
FIGS. 18-29 show different embodiments of modules of the present invention.

In another example, as shown in FIGS. 17*a*, 17*b* and 17*c*, the light source is disposed in the housing with a first reflector 32 positioned in spaced relation in front of the housing and so light emitted from the light source is reflected by the first reflector 32. There is a second reflector 34 also positioned in front of the housing and behind the first reflector 32. Light that passes the first reflector 32 is reflected by the second reflector 34. In addition, if desired, a third reflector 36 can be positioned along the circumference of the inner diameter of the housing with a hole in its center so light can be emitted from the light source through the hole to the first and second reflectors 32, 34. Then light that is reflected from the first and second reflectors 32, 34 which is directed back to the housing is reflected by the third reflector 36 back up to either the first or the second reflectors 32, 34, depending on how the third reflector 36 is angled. In addition, there can be a fourth, and even a fifth or sixth, or even any number of additional reflectors 20 positioned on the back of the first reflector 32 so that light reflected from the second reflector 34 towards the back of the first reflector 32 is then reflected by the reflectors 20 on the back of the first reflector 32 towards the second reflector 34 at a desired angle and then by the second reflector 34 out. In this way, multiple reflections can be achieved with the light in a similar way light is reflected inside a diamond. If desired, the first reflector 32 can have one or more apertures to allow light to directly pass through the first reflector 32.

The modules 68 can take on many different variations in shapes, but can be of a standard form and shape so that they can be easily interchanged. FIGS. 18-29 show, respectively, a module 68 having a bottom reflector 28 only, a top lamp 13 and bottom reflector 28, a top lamp 13 and a bottom lamp 15, a top reflector 21 and a bottom lamp 15, a top reflector 21 and a bottom reflector 28, a top reflector 21 and a bottom reflector 28 with a side reflector 23 directed down, a top lamp 13 and bottom lamp 15 with a side lamp reflector 25, a bottom lamp 15, a top lamp 13, a top reflector 21 and a bottom reflector 28 with a side lamp 17 facing down, a top reflector 21 and a bottom reflector 28 with a side lamp 17 facing up and a top reflector 21 and bottom reflector 28 with a side reflector 23 facing up. It should be noted that in FIGS. 23, 24 and 29, where there is a side reflector 23 facing up or down, there can be a reflecting surface on both sides of the reflector 23 to provide reflection of light striking the respective reflector 23 from above or from below.

Figure 32:
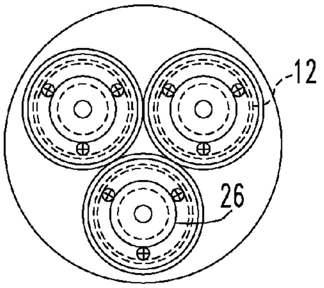
FIGS. 30-32 show isomeric, front and top views, respectively, of three circular housings of a different height with lamps.
Figure 30:
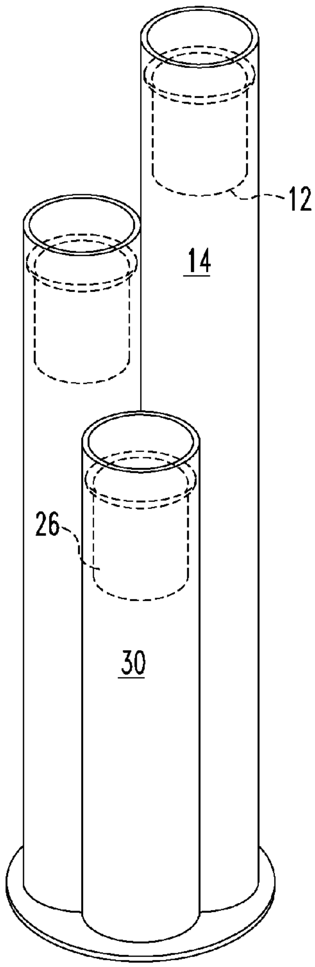
Figure 31:
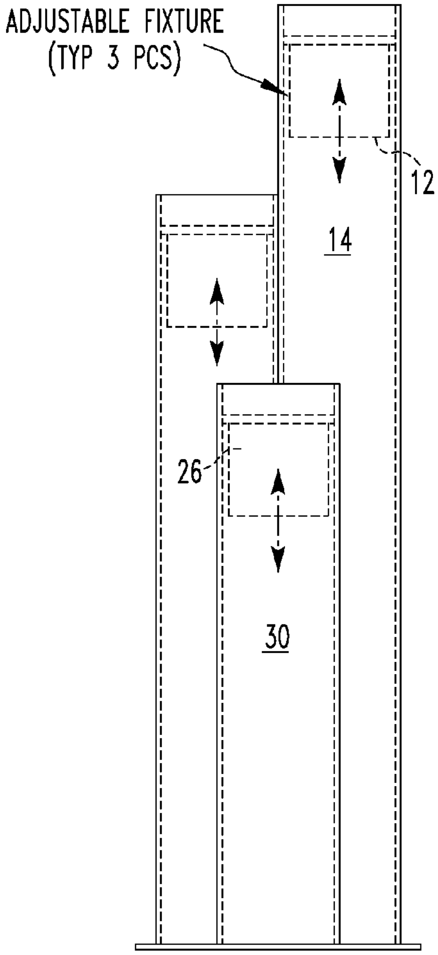
Figure 35:
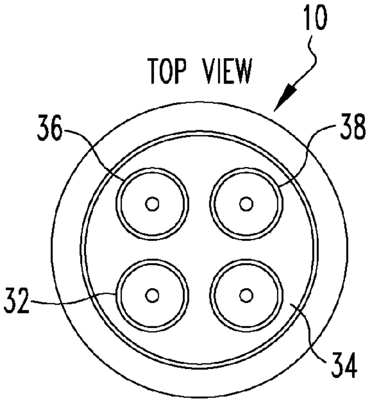
FIGS. 33-35 show isometric, front and top views of a singular circular housing having four lamps and four reflectors.
Figure 33:
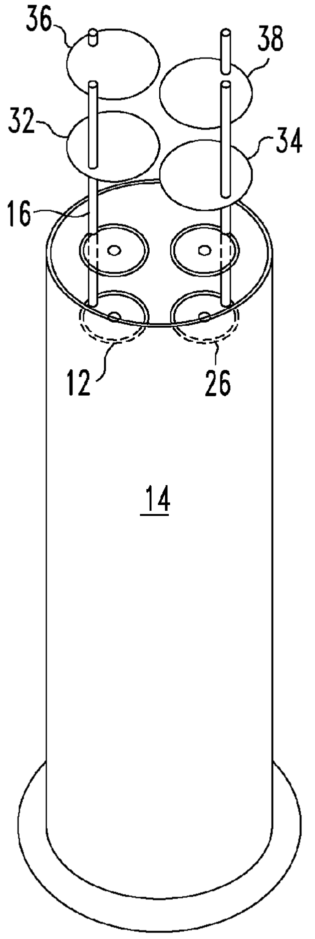
Figure 34:
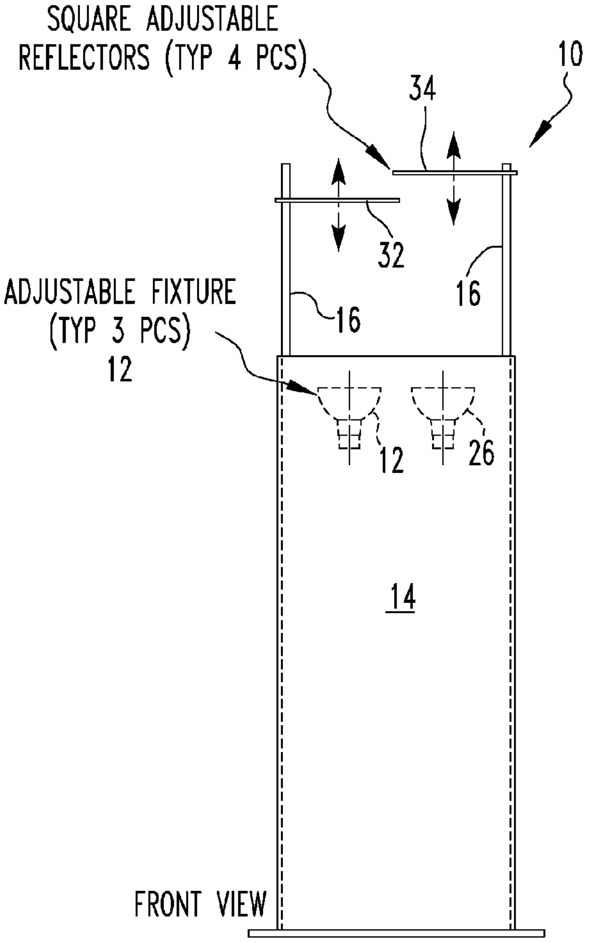
Figure 38:
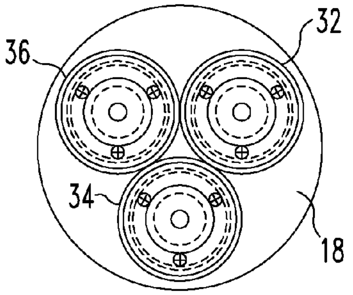
FIGS. 36-38 show isometric, front and top views, respectively, of three circular housings of varied height, each of which has a lamp, with a single reflection portion having three adjustable reflectors.
Figure 36:
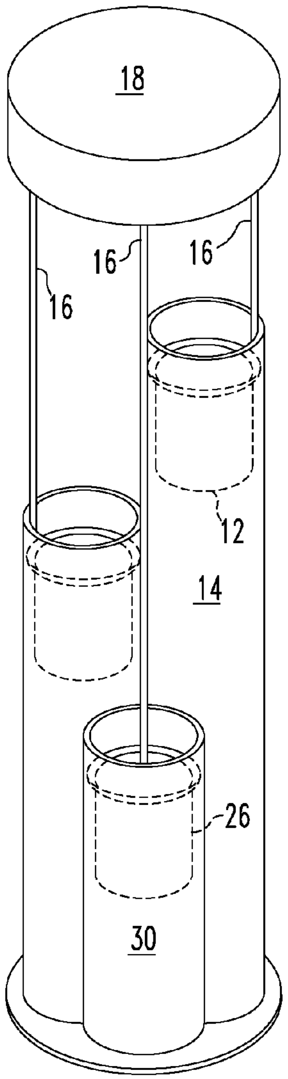
Figure 37:
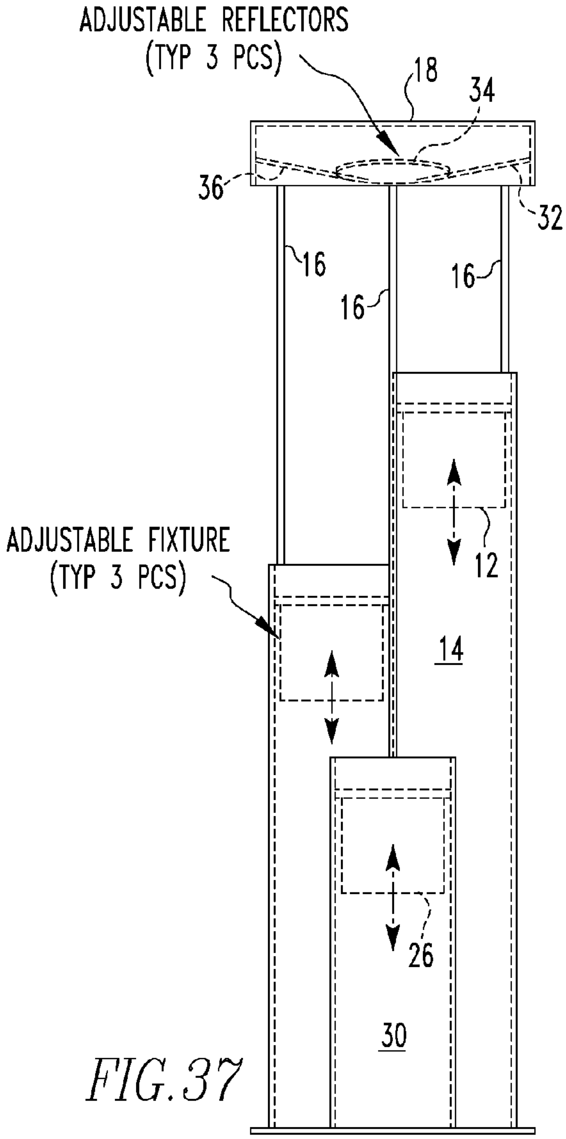
Figure 41:
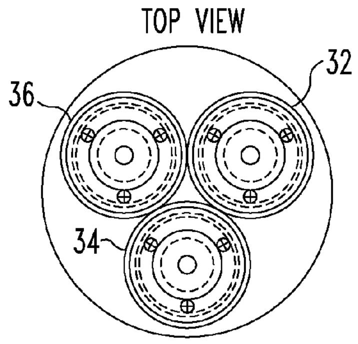
FIGS. 39-41 show isometric, front and top views, respectively, of three circular housings, each of which have a lamp, and three reflectors, with one reflector positioned over each housing.
Figure 39:
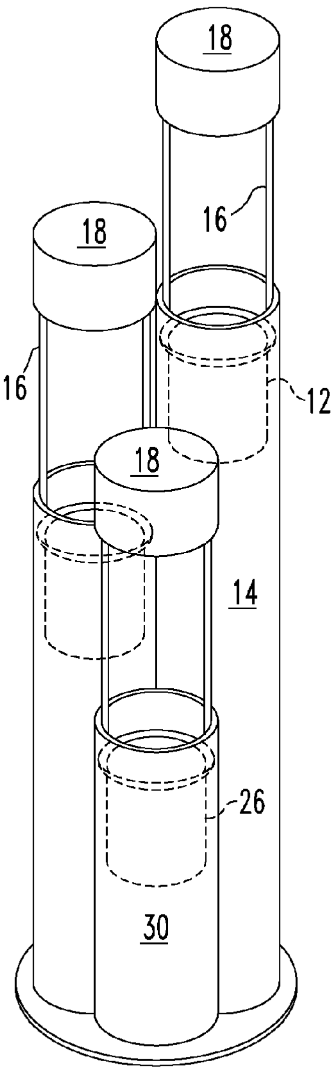
Figure 40:
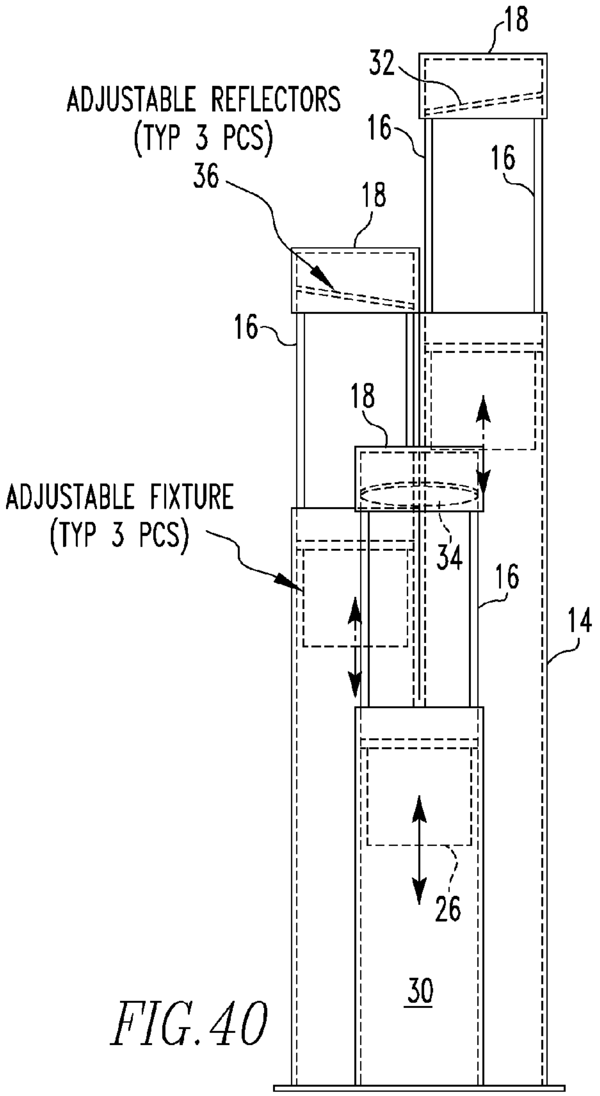
Figure 44:
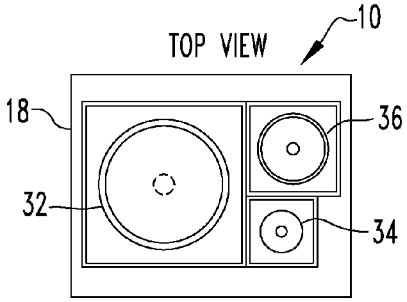
FIGS. 42-44 show isometric, front and top views, respectively, of three square shaped housings of varying height, each of which have a lamp and a single reflection portion having three adjustable reflectors, with each housing having a reflector positioned over it.
Figure 42:
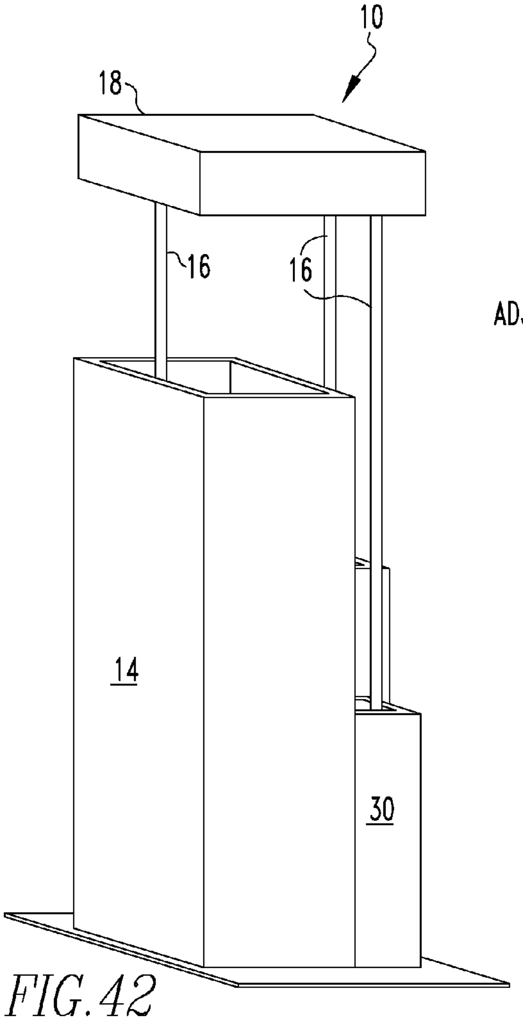
Figure 43:
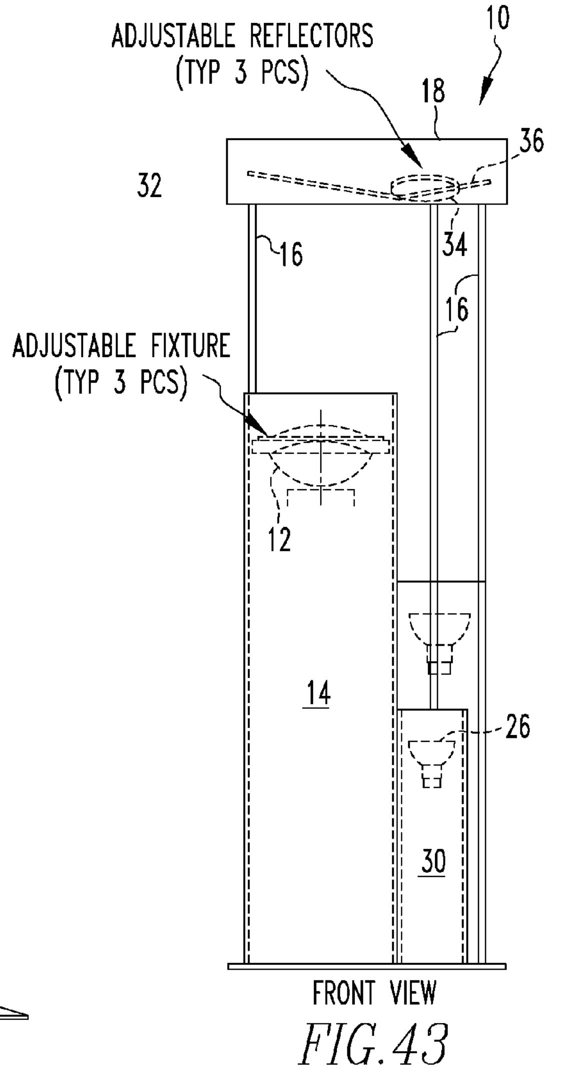
Figure 46:
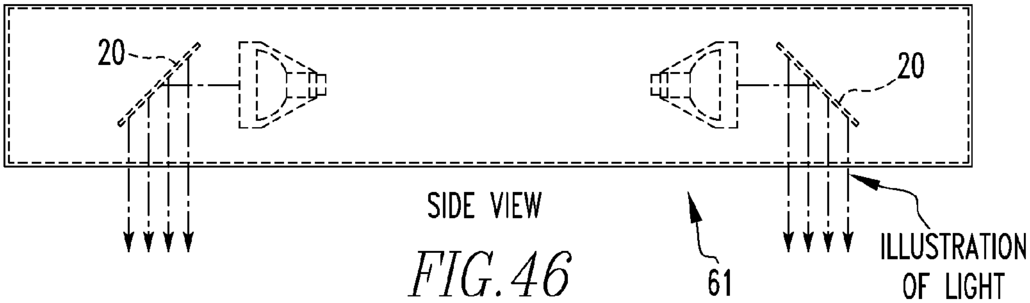
FIG. 46 is a side view of a drum with lamps and internal reflectors.
Figure 45:
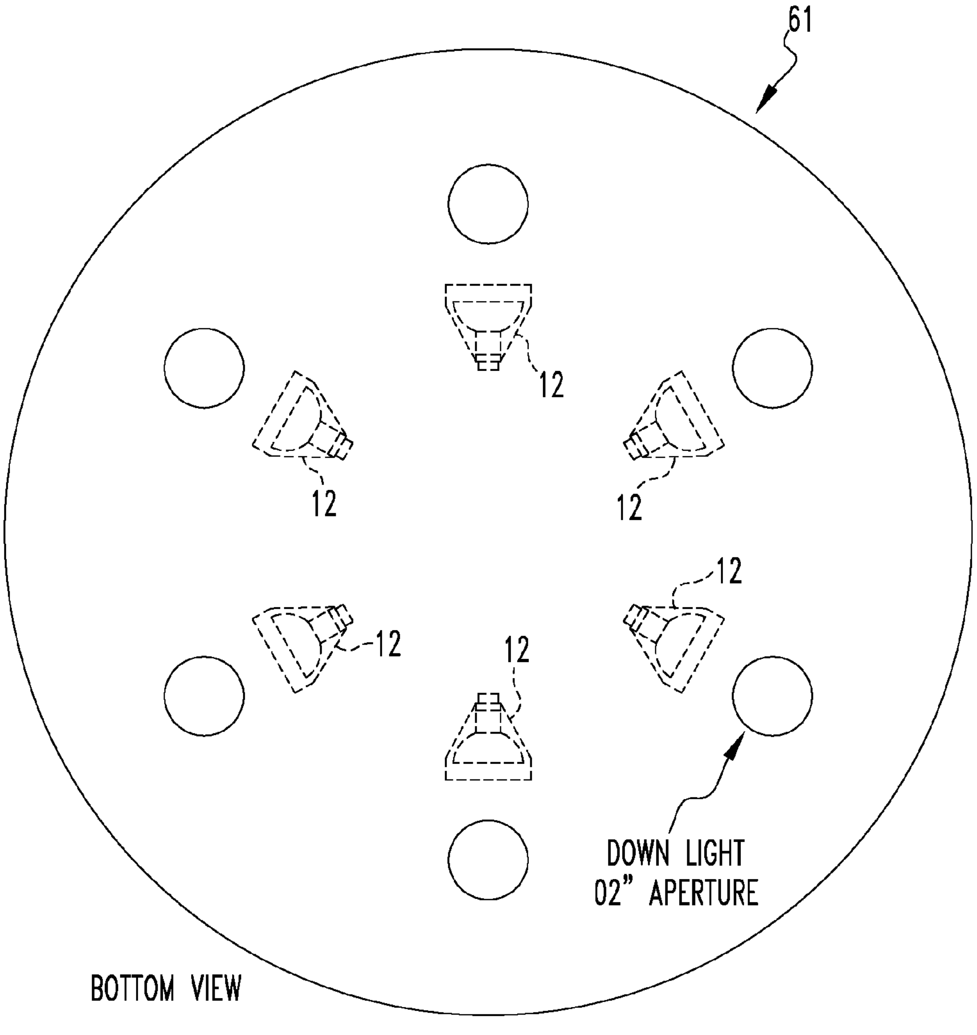
FIG. 45 is a bottom view of a drum with lamps and internal reflectors.
Figure 48:
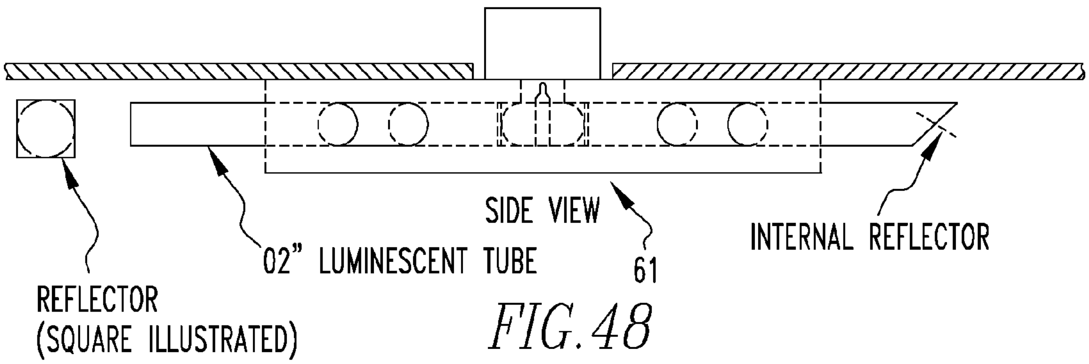
FIG. 48 is a side view of a drum with internal luminescent tubes.
Figure 47:
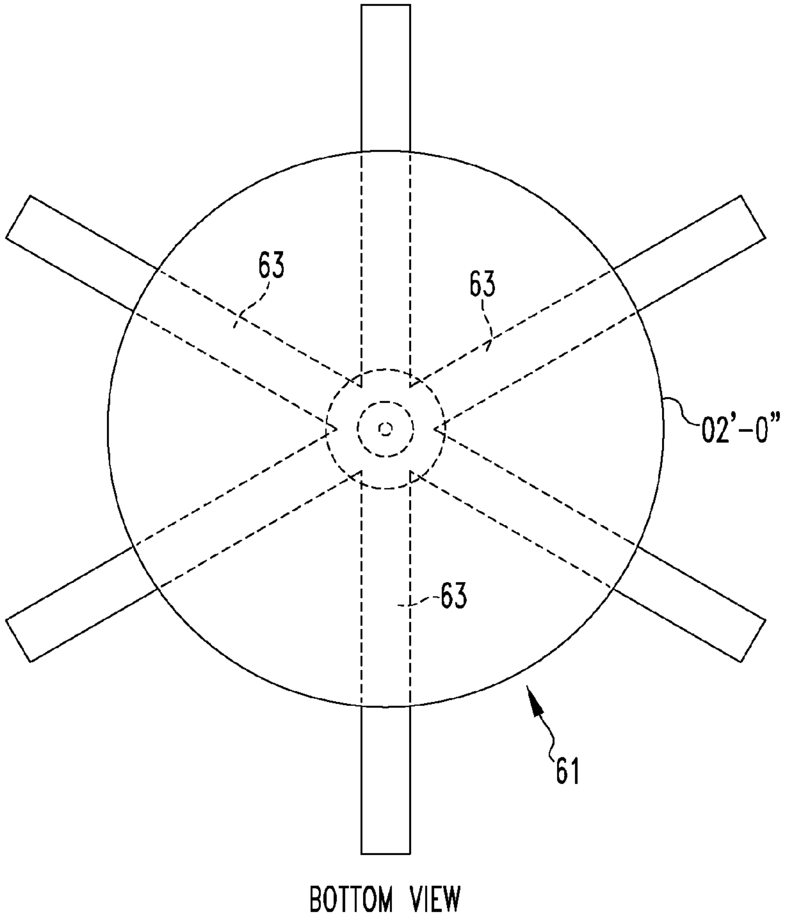
FIG. 47 is a bottom view of a drum with internal luminescent tubes.

FIGS. 30-32 show isomeric, front and top views, respectively, of three circular housings of a different height with lamps. FIGS. 33-35 show isometric, front and top views of a singular circular housing having four lamps and four reflectors 20. FIGS. 36-38 show isometric, front and top views, respectively, of three circular housings of varied height, each of which has a lamp, with a single reflection portion 18 having three adjustable reflectors 20. FIGS. 39-41 show isometric, front and top views, respectively, of three circular housings, each of which have a lamp, and three reflectors 20, with one reflector positioned over each housing. FIGS. 42-44 show isometric, front and top views, respectively, of three square shaped housings of varying height, each of which have a lamp and a single reflection portion 18 having three adjustable reflectors 20, with each housing having a reflector positioned over it.

Another configuration that uses reflectors with one or more light sources utilizes a drum 61, as shown in FIGS. 45-50. In a first embodiment, a drum 61, which can be attached to a ceiling, floor wall or floor, comprises a housing 14 with a plurality of lamps, preferably disposed symmetrically about a central axis of the housing 14 and emitting light radially outwards. It should be noted that any configuration with light sources 12 can be used to obtain whatever desired lighting effect. The lamps 12 can be placed asymmetrically in the drum 61, as an alternative example.

Positioned in front of each lamp and at a desired angle are reflectors mounted inside the housing of the drum 61. The light emitted from a lamp 12 in the drum 61, strikes the reflector 20 and is reflected out of the drum 61 through an aperture in the housing 14 in a desired direction, depending on the angle of the reflector relative to the lamp 12. If desired, each reflector 20 can be motorized, as explained above. From the prospective of an individual in a room with the drum 61 mounted in it, all the individual sees are apertures in the drum 61 with light emitted from the apertures.

In another embodiment with the drum 61, there is a central light source disposed at the central axis of the housing 14. Radiating radially outwards from the central axis are internal luminescent tubes 63 that have apertures at the end of a tube 63, or reflectors that reflect light propagating down the luminescent tube 63 through an aperture in the bottom face of the housing 14. In regard to tubes 63 that have apertures at their end in the side of the housing, reflectors are mounted in alignment with the tubes to reflect light to a desired location in the room. If desired, the reflectors can be motorized, as explained above. The luminescent tubes 63 have a common central location from which light at the central axis feeds each of the luminescent tubes 63.

Figure 50:
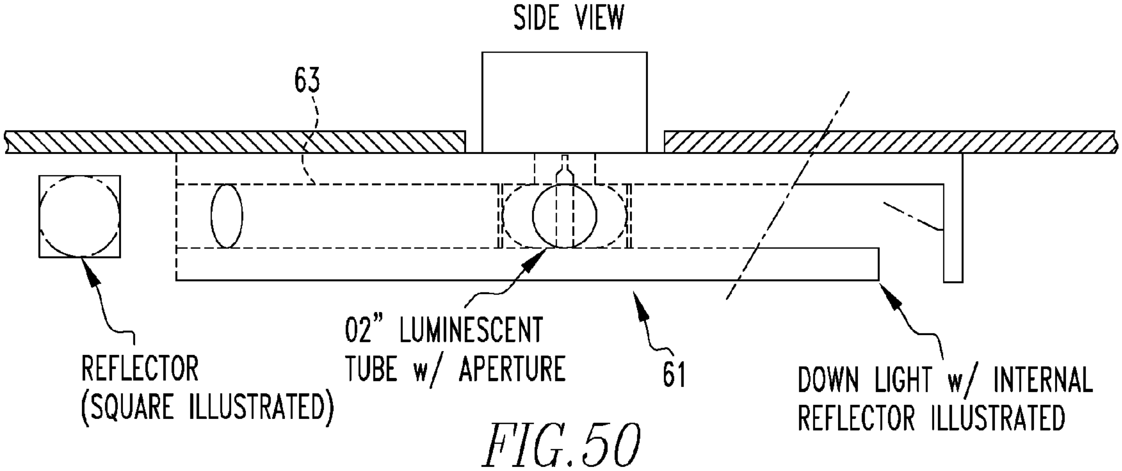
FIG. 50 is a side view of a drum with external luminescent tubes.
Figure 49:
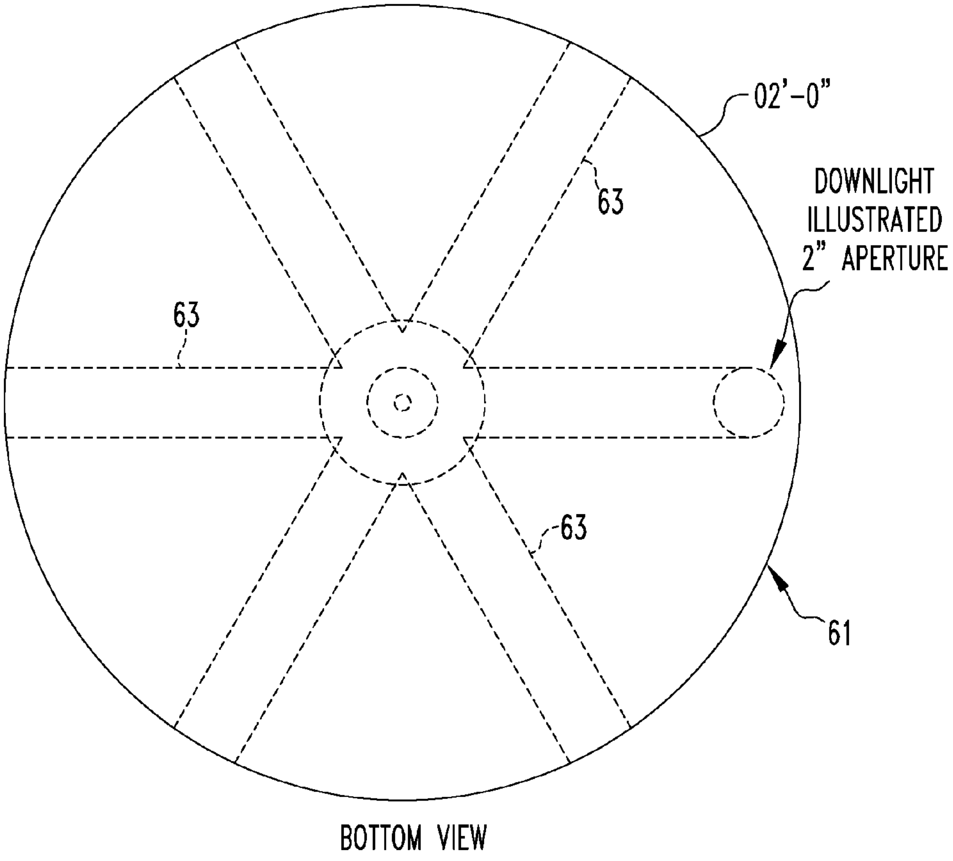
FIG. 49 is a bottom view of a drum with external luminescent tubes.

In an alternative embodiment, FIGS. 49 and 50 show a drum 61 with external luminescent tubes 63, instead of internal tubes 63, as described above. In regard to this alternative embodiment, the ends of the luminescent tubes 63 extend beyond the sides of the housing, and any tube with internal reflectors, has its internal reflector 20 mounted at the end of the tube. Like the internal luminescent tubes 63 that have their apertures in the side of the housing, in this alternative embodiment, there are reflectors mounted in front of the apertures of the end of the luminescent tubes 63 to reflect light emitted from the luminescent tubes 63 to desired locations in the room. As an aside, it should be noted that these drums 61 can also be used on a lawn or wall or ceiling outside a building, to achieve desired lighting effects.

Figure 51:
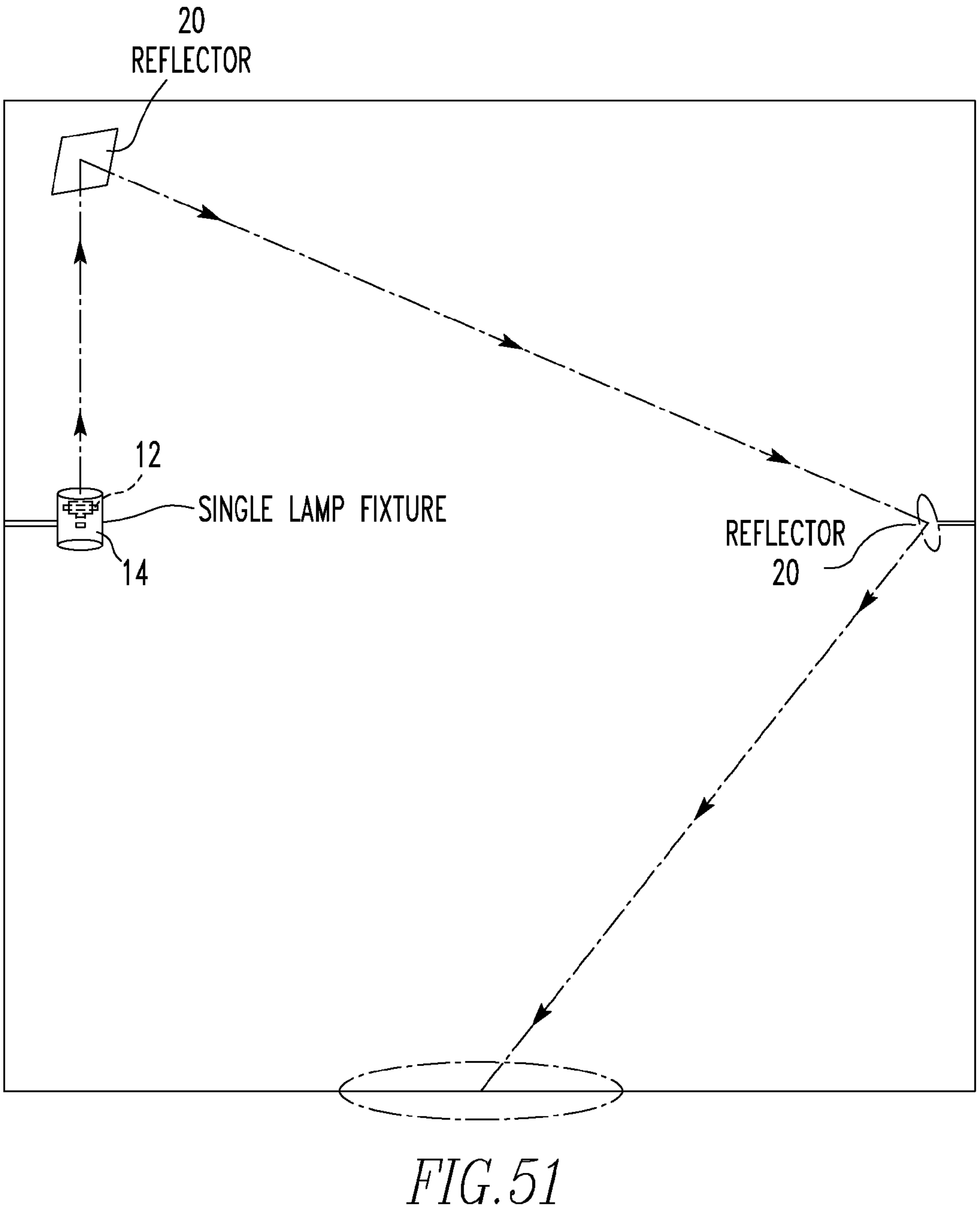
FIG. 51 is a schematic representation of a lamp with two reflectors.
Figure 52:
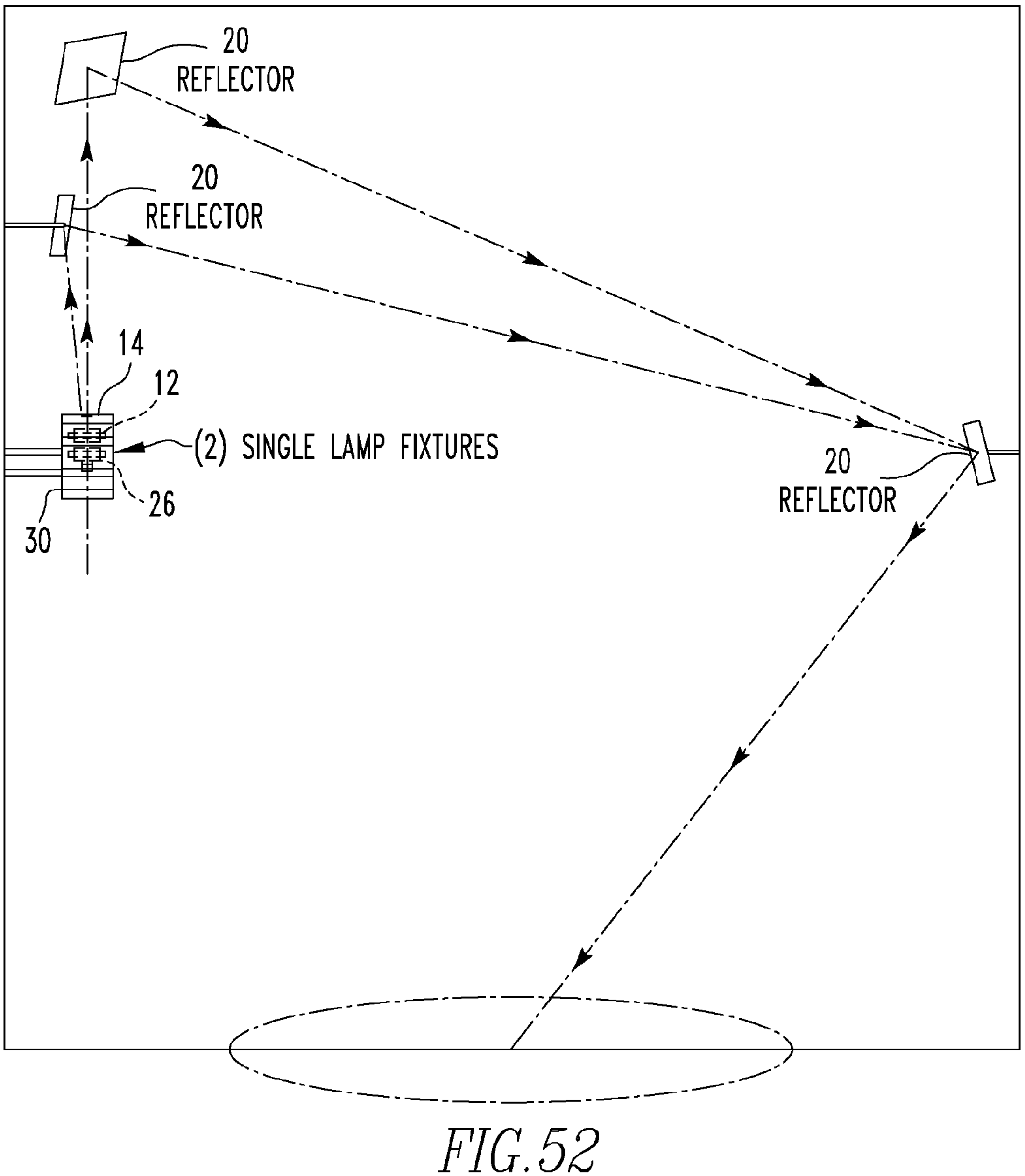
FIG. 52 is a schematic representation of two lamps with three reflectors.
Figure 53:
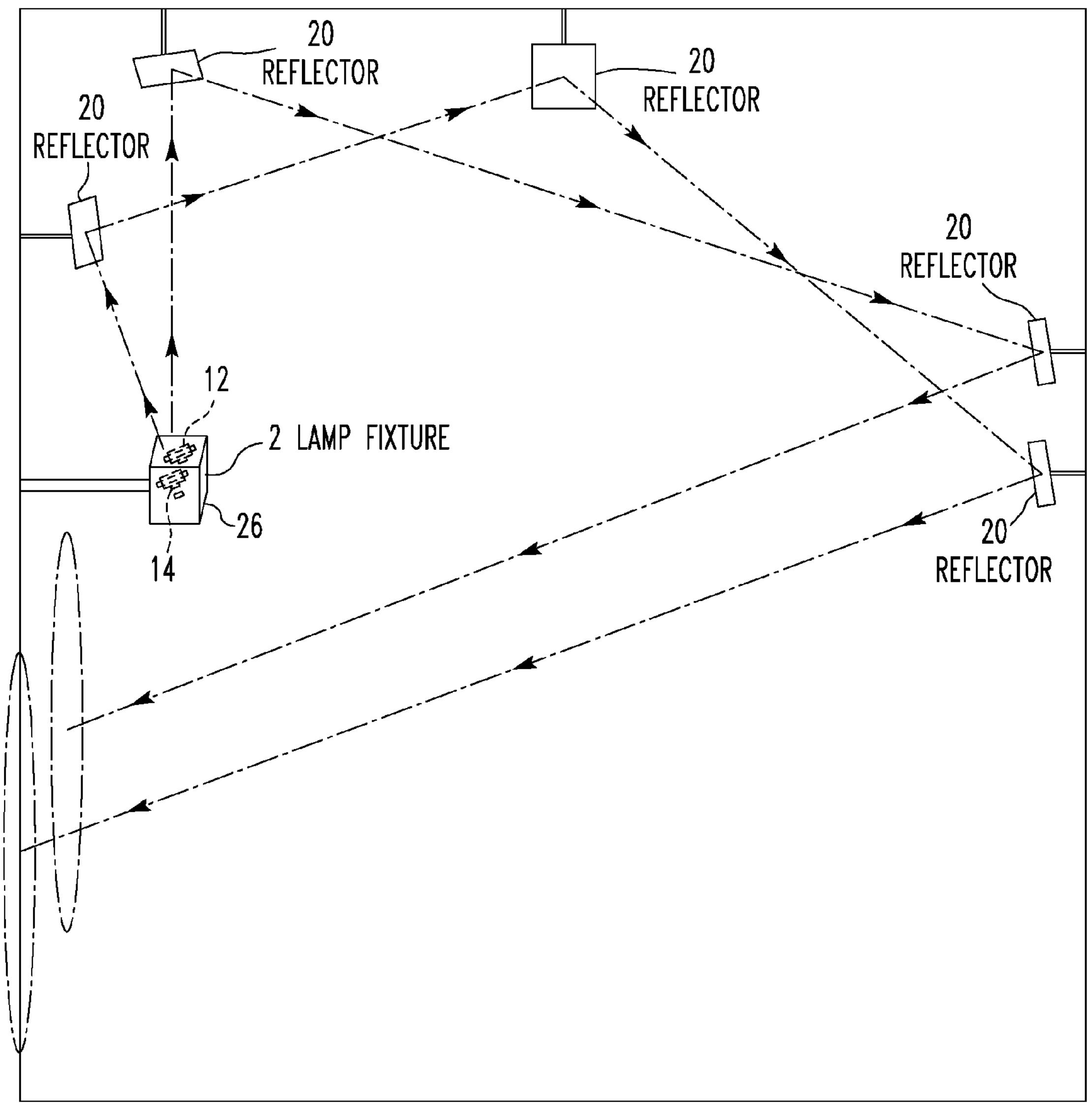
FIG. 53 is a schematic representation of two lamps with four reflectors.

The light source and reflectors do not need to be connected by a support structure. They can be mounted on separate walls or ceilings or floors, but aligned so the light emitted from a light source is reflected by the reflectors. FIG. 51 shows a first light source 12 in a first housing mounted to a first wall emitting light that is reflected by a first reflector 20 mounted on the ceiling, to a second reflector mounted on a second wall. FIG. 52 similarly shows a first and second housing having first and second light sources, respectively, emitting light to a reflector 20 mounted on the first wall and a reflector 20 mounted on the ceiling, which reflect the light to a third reflector 20 mounted on the second wall. FIG. 53 shows a similar relationship to FIG. 52 except the two light sources are disposed in the same housing and there is an additional reflector on the ceiling.

It should be noted that lamps can also be motorized. See U.S. patent application Ser. No. 10/123,798, incorporated by reference herein, for a complete description of motorized lamps. Alternatively, the lamps and the reflectors can have an arm that extends from them, and the lamp or the reflector are mounted on a pivotable support. In this way, the lamp or the reflector can be manually moved through gripping the arm and moving it to a desired position, thus moving the lamp or the reflector. In addition, a screw can extend from the housing surface to the pivotable support, when tightened against the pivotable support. The screw locks the pivotable support and, thus, the lamp or reflector in place. For a description of lamp fixtures generally, See U.S. Pat. Nos. 6,234,644 and 6,511,208, incorporated by reference herein.

The reflectors themselves generally can be of a specular or diffuse finish, as is well known in the art. The reflector can also be made of a diochroic glass which allows certain wavelengths of light through and causes other desired wavelength to be reflected. Alternatively, the reflector can be made out of a translucent material.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A mirror module comprising:
a mirror;
a mirror housing;
a mounting box that fits into the housing; and
a motorized element disposed in the mounting box, the motorized element having a mirror mounting plate which holds the mirror, and a base plate which is attached to the mounting box through an axis screw at a central axis of the module about which the motorized element rotates.

2. The module of claim 1 wherein the motorized element has a motorized wheel mounted to the base plate and which extends through a slot in the base plate.

3. The module of claim 2 wherein the motorized wheel moves along a predetermined path of the mounting box.

4. The module of claim 3 wherein the path has a first stop at +90° and a second stop at −90° to define a range of motion of the motorized wheel and thus the motorized element in a rotational direction around the control axis.

5. The module of claim 4 wherein the motorized element has a first motor mounted to the base plate that has a cylinder on which the motorized wheel is attached.

6. The module of claim 5 wherein the first motor provides left to right movement of the wheel between the positive 90° and the −90° of the path.

7. The module of claim 6 wherein the motorized element has a second motor mounted to the base plate.

8. The module of claim 7 wherein the second motor provides a belt driven wheel for up and down movement of the motorized wheel.

9. The module of claim 8 including a stem which extends from and is attached to the mounting plate to the base plate.

10. A lighting apparatus comprising:
a housing having a central axis and apertures;
a light source disposed in the housing; and
motorized reflectors disposed in the housing which reflect light from the light source through the apertures.

11. An apparatus as described in claim 10 wherein the light source includes a plurality of lamps disposed symmetrically about the central axis, and wherein the reflectors are positioned in alignment with the lamps, to reflect light emitted from each lamp through the apertures in the housing.

12. An apparatus as described in claim 11 including luminescent tubes disposed in the housing through which light from the light source propagates to the reflectors.

13. A method for lighting comprising:
attaching a first housing in which a first light source is disposed to a support structure; and
attaching a reflection portion having at least two motorized reflectors to the support structure and in spaced relationship with the first housing such that light from the first light source is directed to desired locations by the reflectors.

* * * * *